United States Patent
Meyer

(10) Patent No.: US 8,223,189 B2
(45) Date of Patent: Jul. 17, 2012

(54) SYSTEMS AND METHODS OF PROVIDING VIDEO FEATURES IN A STANDARD TELEPHONE SYSTEM

(75) Inventor: Arndt M. Meyer, Leonberg (DE)

(73) Assignee: Dialogic Corporation, Monteral, Quebec (CA)

( * ) Notice: Subject to any disclaimer, the term of this patent is extended or adjusted under 35 U.S.C. 154(b) by 27 days.

(21) Appl. No.: 12/833,372

(22) Filed: Jul. 9, 2010

(65) Prior Publication Data
US 2012/0007941 A1 Jan. 12, 2012

(51) Int. Cl.
*H04M 11/00* (2006.01)
(52) U.S. Cl. .................................. 348/14.01; 379/202.1
(58) Field of Classification Search ............. 379/202.01; 348/14.01–14.08, 11–16; 455/63
See application file for complete search history.

(56) References Cited

U.S. PATENT DOCUMENTS

| | | | |
|---|---|---|---|
| 4,691,347 A | 9/1987 | Stanley et al. | |
| 5,790,780 A * | 8/1998 | Brichta et al. | 714/46 |
| 5,841,763 A | 11/1998 | Leondires et al. | |
| 5,990,933 A | 11/1999 | Ozone et al. | |
| 6,020,915 A | 2/2000 | Bruno et al. | |
| 6,697,476 B1 | 2/2004 | O'Malley et al. | |
| 7,054,424 B2 | 5/2006 | O'Malley et al. | |
| 2003/0046705 A1 * | 3/2003 | Sears | 725/106 |
| 2004/0101120 A1 * | 5/2004 | O'Malley et al. | 379/202.01 |
| 2006/0070003 A1 * | 3/2006 | Thompson et al. | 715/758 |
| 2006/0173972 A1 | 8/2006 | Jung et al. | |
| 2007/0120967 A1 | 5/2007 | Eshkoli et al. | |
| 2008/0062253 A1 * | 3/2008 | Jaspersohn et al. | 348/14.11 |
| 2008/0084985 A1 * | 4/2008 | Diethorn et al. | 379/202.01 |

FOREIGN PATENT DOCUMENTS

| WO | WO 00/57620 | 9/2000 |
|---|---|---|
| WO | WO 2008/098247 | 8/2008 |

* cited by examiner

*Primary Examiner* — Curtis Kuntz
*Assistant Examiner* — Maria El-Zoobi
(74) *Attorney, Agent, or Firm* — Weingarten, Schuring, Gagnebin & Lebovici LLP

(57) ABSTRACT

Systems and methods of providing video support for standard (i.e., non-video-capable) communications systems that require little or no modifications to any existing standard communications systems. The systems and methods can be implemented between at least one video channel and a standard communications system to establish call connections between a user of a video-capable communications device and a user of a standard (i.e., non-video-capable) communications device, to access video content and any associated audio content stored on a video server, and to exchange audio between the respective users of the video-capable and standard communications devices while controlling the video and/or audio output of the video-capable communications device, using the video content and any associated audio content accessed from the video server. The systems and methods can significantly enhance the experience of the user of the video-capable communications device, without requiring cost prohibitive upgrading or replacement of any existing standard communications systems.

30 Claims, 11 Drawing Sheets

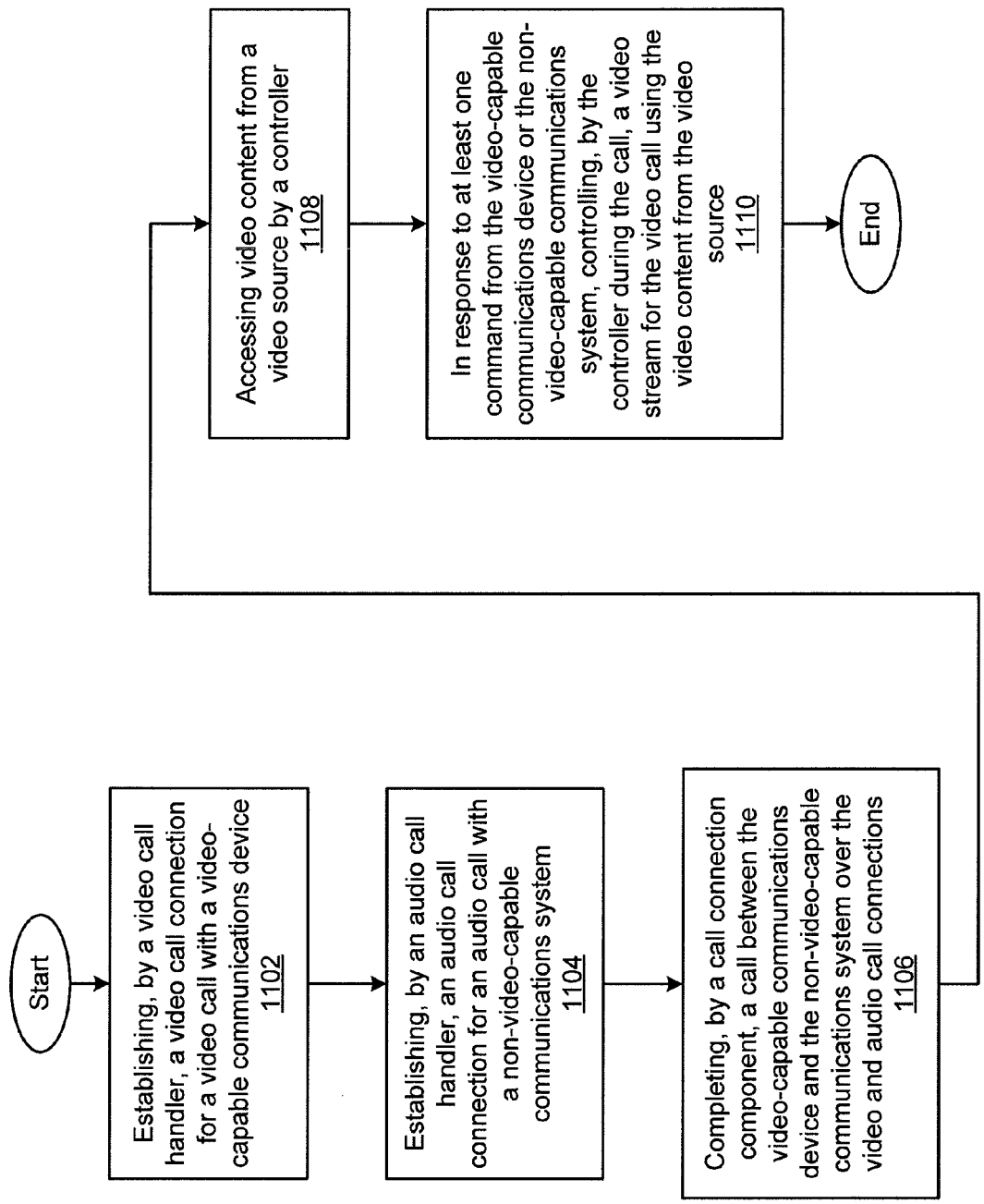

SYSTEMS AND METHODS OF PROVIDING VIDEO FEATURES IN A STANDARD TELEPHONE SYSTEM

CROSS REFERENCE TO RELATED APPLICATIONS

Not applicable

STATEMENT REGARDING FEDERALLY SPONSORED RESEARCH OR DEVELOPMENT

Not applicable

FIELD OF THE INVENTION

The present application relates generally to voice and video communications systems and methods, and more specifically to systems and methods of providing video support for standard (i.e., non-video-capable) communications systems.

BACKGROUND OF THE INVENTION

In recent years, important advances have been made in the development and implementation of communications networks, systems, and devices capable of supporting video calls. For example, communications devices such as mobile phones have been configured with internal cameras and video call software that enable them to make and receive video calls over broadband wireless UMTS (Universal Mobile Telecommunications System) networks, which conform to the 3G ($3^{rd}$ Generation) family of standards for mobile telecommunications specified by the International Telecommunications Union (ITU). In addition, personal computers have been equipped with devices such as webcams and microphones that allow them to make and receive low-cost video calls over IP (Internet Protocol) networks such as the Internet and other packet-switched networks, using Skype applications and other video call applications. Mobile phones, personal computers, and other video-capable communications devices have also been configured to employ other video call applications such as SIP (Session Initiation Protocol) applications that allow them to make and receive video calls over IP networks.

Although important advances have been made in the development and implementation of communications networks, systems, and devices with video capability, the actual usage of video-capable communications devices for placing video calls has tended to advance at a slower rate. One reason for this may be the prevalence of less-than-satisfying user experiences when placing video calls. For example, when attempting to make video calls with video-capable communications devices (for example, video-capable mobile phones or personal computers), users of such video-capable communications devices may encounter one or more possible obstacles to satisfactory completion (if not completion in general) of the video calls. Such obstacles to video call completion may result from attempts to place video calls to users of standard communications devices such as non-video-capable mobile phones, non-video-capable personal computers, or audio telephones, and/or attempts to place video calls through standard communications systems or networks such as audio telephone systems or networks. The terms "standard communications device," "standard communications system," and "standard communications network" are employed herein to refer to any non-video-capable communications device, system, or network.

In response to such attempts to place video calls to users of standard communications devices and/or through standard communications systems or networks, the video calls may be dropped from the standard communications systems or networks. The standard communications systems may also send error messages to the users of the video-capable communications devices, indicating that the video calls cannot be completed. Further, the standard communications systems may prompt the users of the video-capable communications devices to record and send audio messages or send e-mail messages to the users of the standard communications devices, or to terminate the video calls and place voice calls instead. In some cases, the standard communications systems may automatically transform the video calls into voice calls to avoid requiring the users of the video-capable communications devices to terminate and re-establish the respective calls.

In each of the above scenarios, however, the standard communications systems typically fail to effectively utilize the video features of the video-capable communications devices, thereby degrading the experiences of the users of the video-capable communications devices. For example, such standard communications systems typically fail to effectively employ the video features of video-capable communications devices when sending error messages to the respective devices, or when prompting the users of the respective devices to perform specific actions. Even in cases where call connections are successfully established between video-capable communications devices and standard communications devices, such standard communications systems are typically incapable of providing any level of control over the video outputs of the video-capable communications devices during the calls, further degrading user experiences and discouraging increased usage of video-capable communications devices. Moreover, although it may be possible to upgrade or replace at least some of the existing standard communications systems to provide video capabilities, wholesale upgrading or replacement of such standard communications systems would likely prove to be cost prohibitive.

It would therefore be desirable to have systems and methods of providing video support for standard (i.e., non-video-capable) communications systems that avoid one or more of the drawbacks of the standard communications systems discussed above.

BRIEF SUMMARY OF THE INVENTION

In accordance with the present application, systems and methods of providing video support for standard (i.e., non-video-capable) communications systems are disclosed that require little or no modifications to any existing standard communications systems. The presently disclosed systems and methods can be implemented between at least one video channel and a standard communications system to handle video calls initiated by or directed to a user of a video-capable communications device, to access video content and any associated audio content from a video server, to handle voice calls initiated by or directed to a user of a standard (i.e., non-video-capable) communications device in conjunction with the standard communications system, and to exchange audio (e.g., voice) streams between the respective users of the video-capable communications device and the standard communications device, while controlling the audio and/or video outputs of the video-capable communications device during or otherwise in relation to a call, using the audio/video content accessed from the video server.

In accordance with one exemplary aspect, a system for providing video support for a standard communications system comprises a video support system communicably coupleable to a standard communications system and a video server. The video support system includes a video call handling module, a voice call handling module, a video repository module, a configuration module, and a call connection matrix, which is communicably coupled to the video call handling module, the voice call handling module, the video repository module, and the configuration module. The video call handling module is operative to handle video calls initiated by or directed to at least one user of at least one video-capable communications device, and the voice call handling module is operative, in conjunction with the standard communications system, to handle voice calls initiated by or directed to at least one user of at least one standard communications device. The video support system is operative to access video content and any associated audio content stored on the video server, for use in controlling the audio and/or video outputs of the video-capable communications device. The video support system is further operative to receive and to act on commands initiated by the user of the video-capable communications device, the user of the standard communications device, and/or the standard communications system, for controlling the audio/video outputs of the video-capable communications device.

In accordance with one exemplary aspect, the video-capable communications device, the standard communications device, and/or the standard communications system are operative to direct commands to the video support system in the form of predetermined DTMF (dual tone multi-frequency) tones or tone sequences. The configuration module may be employed to define the behavior of the video support system in response to any of the possible commands directed to it by the video-capable communications device, the standard communications device, and/or the standard communications system. In accordance with another exemplary aspect, the configuration module may be employed to define, as desired or required, a menu tree structure for use by the user of the video-capable communications device, rules for providing video content and any associated audio content to the video-capable communications device, and phone numbers for use in communicably linking together the video support system and the standard communications system in an operative fashion. The video repository module is operative to access video content and any associated audio content stored on the video server. The call connection matrix includes a number of functional components, including, but not limited to, at least one audio/video splitter component, at least one DTMF detector, and at least one audio or voice mixer. In accordance with a further exemplary aspect, the call connection matrix includes a first audio/video splitter component at an interface to the video call handling module, and a second audio/video splitter component at an interface to the video repository module. The first and second audio/video splitter components are operative to effectively split audio/video signals provided by the video call handling module and the video repository module, respectively, to produce separate audio and video streams for processing within the video support system. In accordance with this further exemplary aspect, the call connection matrix includes a first DTMF detector for detecting commands (e.g., DTMF tones or tone sequences) provided by the video-capable communications device, a second DTMF detector for detecting commands (e.g., DTMF tones or tone sequences) provided by the standard communications system and/or the standard communications device, a first voice mixer for mixing and controlling the volume levels of audio signals provided by the voice call handling module and audio signals associated with video content accessed from the video server, and a second voice mixer for mixing and controlling the volume levels of audio signals provided by the video call handling module and audio signals associated with video content accessed from the video server. The first and second voice mixers are operative to provide the mixed audio signals with controlled volume levels to the video and voice call handling modules, respectively.

In accordance with presently disclosed systems and methods, the video support system may be configured to allow varying levels of control over the audio and/or video outputs of a video-capable communications device. In accordance with one exemplary aspect, the video support system effectively operates as a video front end for a standard communications system to provide a first level of control over the audio/video outputs of a video-capable communications device, during or otherwise in relation to a call with a standard communications device. For example, the video-capable communications device may be a mobile phone or any other suitable video-capable communications device, and the standard communications device may be an audio telephone or any other suitable non-video-capable communications device. Further, the standard communications system communicably coupleable to the video support system may comprise a single line telephone system or any other suitable non-video-capable communications system. In accordance with this exemplary aspect, a user of the mobile phone makes or places a video call directed to a user of the audio telephone. The video support system receives the video call, accesses specified video content and associated audio content stored on the video server, derives an audio/video signal from the video and audio content, and provides a corresponding audio/video stream to the mobile phone in answer to the video call, thereby establishing a video call connection between the mobile phone and the video support system. The mobile phone generates audio/video outputs from the audio/video stream for consumption (e.g., listening/viewing) by the mobile phone user. For example, the audio/video content accessed by the video support system from the video server may comprise a video clip containing information about a private household, a workplace, or any other suitable location associated with a company or organization that the user of the audio telephone is associated with. Once the video call connection is established with the mobile phone, the video support system makes or places a voice call to the single line telephone system, which accepts the call, thereby establishing a voice call connection between the video support system and the single line telephone system. Via the voice call connection, the video support system can receive audio (e.g., voice) streams produced by the user of the audio telephone. The video support system mixes the audio stream from the audio telephone with the audio stream from the video clip, and provides the mixed audio stream to the mobile phone, which generates an audio output from the mixed audio stream that can be listened to by the mobile phone user. As a result, the user of the mobile phone can view the video from the video clip on the video output, e.g., a display, of the mobile phone, while listening to the voice of the user of the audio telephone via the audio output, e.g., a speaker, of the mobile phone. The mobile phone user can also listen to the audio from the video clip mixed with the voice of the audio telephone user via the speaker of the mobile phone, depending on the controlled volume levels of the respective audio signals.

In accordance with another exemplary aspect, the video support system provides a second level of control over the audio/video outputs of a video-capable communications device, during or otherwise in relation to a call with a standard communications device. For example, the video-capable communications device may be a mobile phone or any other suitable video-capable communications device, and the standard communications device may be one of several audio telephones or any other suitable non-video-capable communications devices. Further, the standard communications system communicably coupleable to the video support system may comprise a call center or any other suitable non-video-capable communications system. In accordance with this exemplary aspect, a user of the mobile phone can interact with the call center by initiating commands (e.g., DTMF tones or tone sequences), and directing the commands to the video support system. To that end, the user of the mobile phone makes or places a video call directed to the call center. The video support system receives the video call, accesses video content and associated audio content stored on the video server, derives an audio/video signal from the video and audio content, and provides a corresponding audio/video stream to the mobile phone in answer to the video call, thereby establishing a video call connection between the mobile phone and the video support system. Once the video call connection is established with the mobile phone, the video support system makes or places a voice call to the call center, which, in answer to the voice call, provides an audio stream to the video support system to establish a voice call connection between the video support system and the call center. In response to receipt of the audio/video stream from the video support system, the mobile phone generates audio/video outputs for consumption (e.g., listening/viewing) by the user of the mobile phone. For example, the audio/video content accessed by the video support system from the video server may comprise a video clip welcoming the mobile phone user to the call center, and showing a menu tree structure containing a predetermined number of options available to the user of the mobile phone, such as "Press '1' for Marketing," "Press '2' for Sales," "Press '3' for Support Services," etc. The user of the mobile phone selects one of the available menu options, and presses at least one key on the mobile phone corresponding to the selected option, such as the 1, 2, or 3 key, causing the video support system to receive the DTMF tone or tone sequence for the depressed key. Based at least in part on the DTMF tone or tone sequence for the depressed key, the video support system may provide at least one additional audio/video stream to the mobile phone to produce new audio/video outputs on the mobile phone. For example, the new audio/video outputs may indicate one or more additional menu options available to the mobile phone user, such as "Please enter your PIN number." In this way, the video support system can provide audio/video streams containing available menu options to the mobile phone, such that the available menu options conform to the specific requirements of the call center.

The video support system passes, to the call center, the DTMF tone or tone sequence for the key pressed by the mobile phone user. Based on the DTMF tone or tone sequence for the depressed key, the call center may perform one or more actions that would normally be directed to any typical user of a standard audio telephone. For example, the call center may make or place a voice call to an appropriate individual on one of the audio telephones, such as a marketing representative if the 1 key were pressed, a sales representative if the 2 key were pressed, or a support services representative if the 3 key were pressed. Further, the appropriate individual may answer the voice call, causing the audio telephone to provide an audio stream to the video support system. For example, the video support system may receive audio (e.g., voice) streams produced by the appropriate individual, i.e., the marketing, sales, or support services representative, using the audio telephone. The video support system mixes the audio stream from the audio telephone with the audio stream from the video clip, and provides the mixed audio stream to the mobile phone, which generates an audio output from the mixed audio stream that can be listened to by the mobile phone user. The marketing, sales, or support services representative on the audio telephone can now speak with the user of the mobile phone over the respective call connections. The marketing, sales, or support services representative can also control at least some of the audio/video outputs produced by the mobile phone, for example, by sending predetermined commands (e.g., DTMF tones or tone sequences) to the video support system. Based on these commands, the video support system accesses, as desired or required, additional video content and any associated audio content stored on the video server, and provides corresponding audio/video streams to the mobile phone, which generates audio/video outputs from the audio/video streams for consumption (e.g., listening/viewing) by the user of the mobile phone. For example, the additional audio/video content accessed by the video support system from the video server may comprise a video clip containing information about a product or service offered by the marketing, sales, or support services representative. As a result, the user of the mobile phone can view the video for the additional audio/video content on the display of the mobile phone, while listening to the voice of the marketing, sales, or support services representative via the speaker of the mobile phone. The mobile phone user can also listen to the audio for the additional audio/video content mixed with the voice of the marketing, sales, or support services representative via the speaker of the mobile phone, depending on the controlled volume levels of the respective audio signals.

In accordance with still another exemplary aspect, the video support system may further include at least one automatic speech recognition (ASR) detector to allow the user of the video-capable communications device, the user of the standard communications device, and/or the standard communications system to control the audio/video outputs of the video-capable communications device by directing predetermined commands in the form of speech terms to the video support system for detection by the ASR detector.

By providing a video support system that can handle video calls initiated by or directed to a user of a video-capable communications device, that can handle voice calls initiated by or directed to a user of a standard communications device in conjunction with a standard communications system, that can access video content and any associated audio content stored on a video server, and that can control audio/video outputs of the video-capable communications device based at least in part on the audio/video content accessed from the video server, the experience of the user of the video-capable communications device can be significantly enhanced, thereby fostering increased usage of such video-capable communications devices. Such enhanced user experiences can be achieved without requiring costly upgrading or replacement of any existing standard communications systems.

Other features, functions, and aspects of the invention will be evident from the Drawings and/or the Detailed Description of the Invention that follow.

BRIEF DESCRIPTION OF THE SEVERAL VIEWS OF THE DRAWINGS

The invention will be more fully understood with reference to the following Detailed Description of the Invention in conjunction with the drawings of which:

FIG. 11 is a flow diagram of an exemplary method of operating the video support system of FIG. 1.

DETAILED DESCRIPTION OF THE INVENTION

Systems and methods of providing video support for standard (i.e., non-video-capable) communications systems are disclosed that advantageously require little or no modifications to any existing standard communications systems for implementation. The presently disclosed systems and methods can be implemented between at least one video channel and a standard communications system to establish call connections between a user of a video-capable communications device and a user of a standard (i.e., non-video-capable) communications device, to access video content and any associated audio content stored on a video server, and to exchange audio (e.g., voice) between the respective users of the video-capable communications device and the standard communications device while controlling the audio and/or video outputs of the video-capable communications device during or otherwise in relation to a call, using the audio/video content accessed from the video server. The presently disclosed systems and methods can significantly enhance the experiences of users of video-capable communications devices, without requiring cost prohibitive upgrading or replacement of any existing standard communications systems.

Figure 1:
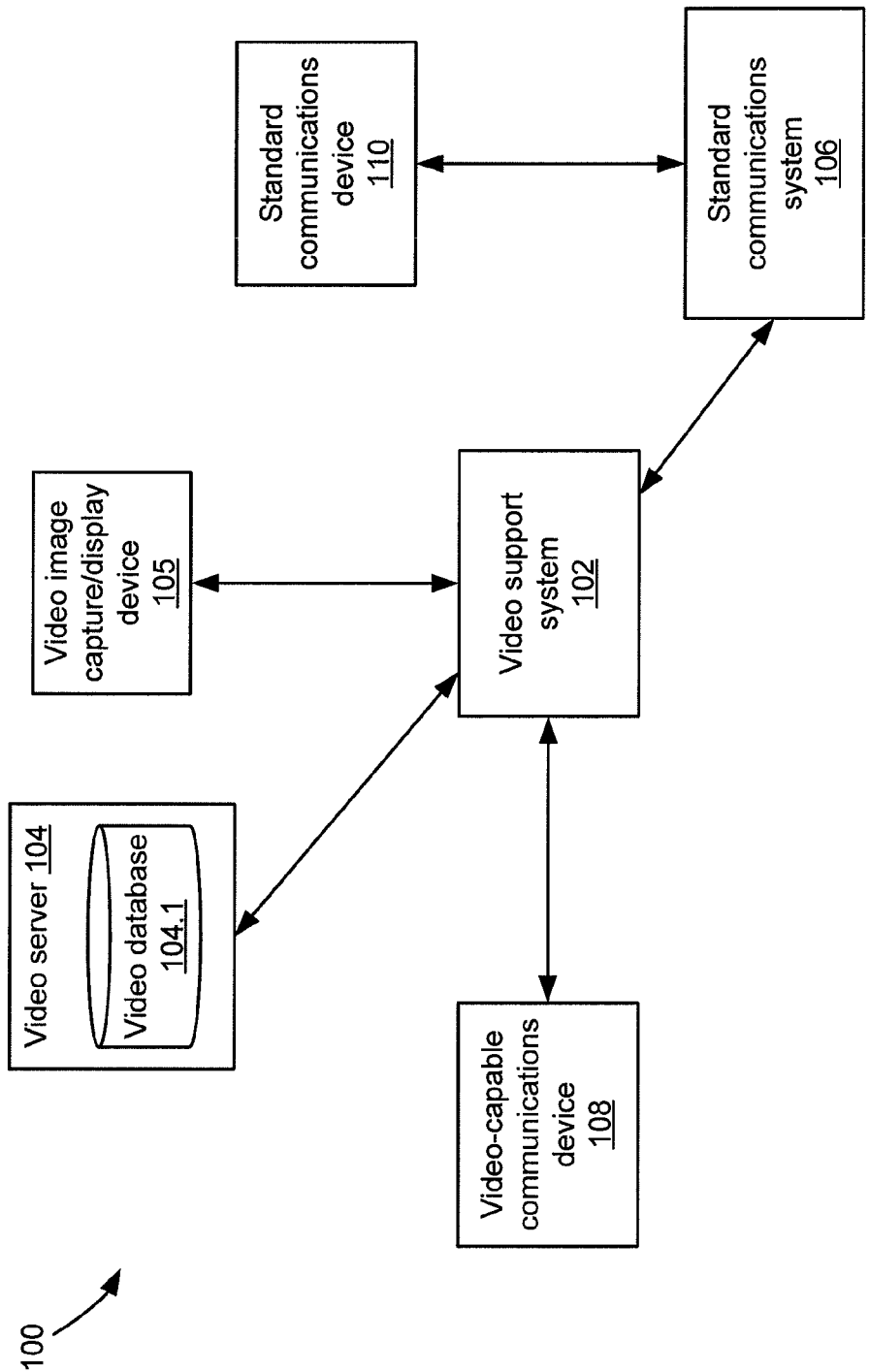
FIG. 1 is a block diagram of an environment in which an exemplary system for providing video support for a standard communications system (referred to herein as the "video support system") may be deployed, according to an exemplary embodiment of the present application.

One problem associated with upgrading or replacing an existing standard communications system (referred to herein as the "standard communications system 106," see FIG. 1) to add video functionality is that the standard communications system 106 would generally have to be either reprogrammed or completely redesigned. However, such reprogramming or redesigning of the standard communications system 106 would likely prove to be too impractical or costly to implement. This is because the standard communications system 106 may have been optimized over several years after deployment, and such optimization would likely have to be performed again after the system 106 is reprogrammed or redesigned with the desired video functionality. Moreover, the original developers of the standard communications system 106 may no longer be available, and the cost of reprogramming or redesigning the standard communications system 106 would likely increase if the work were ultimately done by individuals who are less knowledgeable about the system 106.

One advantage of the presently disclosed system (referred to herein as the "video support system 102," see FIG. 1) is that it allows any owner, manager, or other user of the standard communications system 106 to add video functionality without having to make substantial modifications to the system 106. For example, the standard communications system 106 may be a single line telephone system, a carrier grade telephone system, a call center including an interactive voice response (IVR) system, a public or private branch exchange (PBX), or any other suitable non-video-capable communications system. Moreover, the standard communications system 106 may be used by individuals such as secretaries or operators at locations such as call centers or help desks where no computer-based telephone system is currently deployed.

In one exemplary scenario, the standard communications system 106 may be connected to a traditional telephone line (e.g., analog, E1/T1/J1, ISDN PRI, ISDN BRI, etc.), an IP (Internet protocol) line (e.g., VoIP, FoIP), or any other suitable type of communications line that provides voice connectivity. In this scenario, a user who makes or places a voice call on a non-video-capable communications device (referred to herein as the "standard communications device 110," see FIG. 1), or a user who makes or places a strict voice call on a video-capable communications device (referred to herein as the "video-capable communications device 108," see FIG. 1), would generally be serviced entirely by the standard communications system 106. For example, such users would continue to make or place voice calls to the standard communications system 106, using standard phone numbers for the respective calls. However, if the user of the video-capable communications device 108 makes or places a video call to the standard communications device 110, then he or she would be serviced at least in part by the video support system 102, which can add video components to the video call while mixing any audio associated with the video components with audio from the standard communications device 110. It is noted that the video support system 102 may be configured to permit volume levels of the mixed audio signals to be adjusted using, e.g., DTMF (dual tone multi-frequency) tones or speech recognition, thereby allowing the respective users of the video-capable communications device 108 and the standard communications device 110 to hear the audio signals at the desired volume levels.

It is further noted that various levels of integration and/or interoperability between the video support system 102 and the standard communications system 106 are possible. For example, the video support system 102 may serve as a video front end to the standard communications system 106, allowing a selected video to be played at the video-capable communications device 108 during a call. The choice of which video to play at the video-capable communications device 108 may be fixed, or may depend on the time of day, the phone number of the calling party or the called party, or any suitable input from the calling party, the called party, or other entity. In a further exemplary scenario, the standard communications system 106 may be a single line telephone system, and the video support system 102 may provide a video enhancement to the single line telephone system. In this further scenario, the video support system 102 may accept a video call from the video-capable communications device 108, and may play a video in a compatible video format at the device 108, showing a video message about the called party. Once the video support system 102 receives the video call, the video support system 102 may place a voice call, via the standard communications system 106, to the standard communications device 110 to obtain the audio (e.g., voice) of the user of the standard communications device 110. Moreover, the video support system 102 may be configured to allow the user of the video-capable communications device 108, the user of the standard communications device 110, and/or another suitable entity to control the operation of the video support system 102 and/or the standard communications system 106, using, e.g., DTMF tones, speech recognition, or any other suitable control technique.

FIG. 1 depicts an illustrative embodiment of an environment 100 in which the exemplary video support system 102 for providing video support for the standard communications system 106 may be deployed, in accordance with the present application. In accordance with the illustrative embodiment of FIG. 1, the video support system 102 is communicably coupleable to the standard communications system 106, a video server 104 containing a video database 104.1, and at least one video image capture/display device 105, such as a video-enabled camera and/or any other suitable audio and/or video image capture/display device. The video support system 102 is operative to handle video calls initiated by or directed to at least one user of at least one video-capable communications device, such as the video-capable communications device 108, and, in conjunction with the standard communications system 106, to handle voice calls initiated by or directed to at least one user of at least one standard communications device, such as the standard communications device 110. The video support system 102 is further operative to control access to video content and any associated audio content stored in the video database 104.1, and/or video streams and any associated audio streams generated by the video image capture/display device 105, for use in controlling the video and/or audio outputs of the video-capable communications device 108. In addition, the video support system 102 is operative to receive and to act on commands initiated by the user of the video-capable communications device 108, commands initiated by the user of the standard communications device 110, and/or commands generated by the standard communications system 106, for controlling the audio/video outputs of the video-capable communications device 108.

For example, the video-capable communications device 108 may be implemented as a mobile phone with an internal camera, a 3G ($3^{rd}$ Generation) videophone, a personal computer (PC) with a webcam, a personal digital assistant (PDA) equipped with a camera, a video conferencing device, a laptop computer with a webcam and a 3G modem card, a tablet PC such as the iPad tablet computer, a netbook, or any other suitable video-capable communications device. Further, the standard communications device 110 may be implemented as a 2G ($2^{nd}$ Generation) mobile phone, a non-video-capable personal computer or laptop computer, an audio telephone, a tablet PC such as the iPad tablet computer, a netbook, or any other suitable non-video-capable communications device. In addition, the standard communications system 106 may comprise a single line telephone system, a carrier grade telephone system, a call center including an interactive voice response (IVR) system, a public or private branch exchange (PBX), or any other suitable non-video-capable communications system. It is noted that the terms "standard communications device," "standard communications system," and "standard communications network" are employed herein to refer to any non-video-capable communications device, system, or network.

Figure 2:
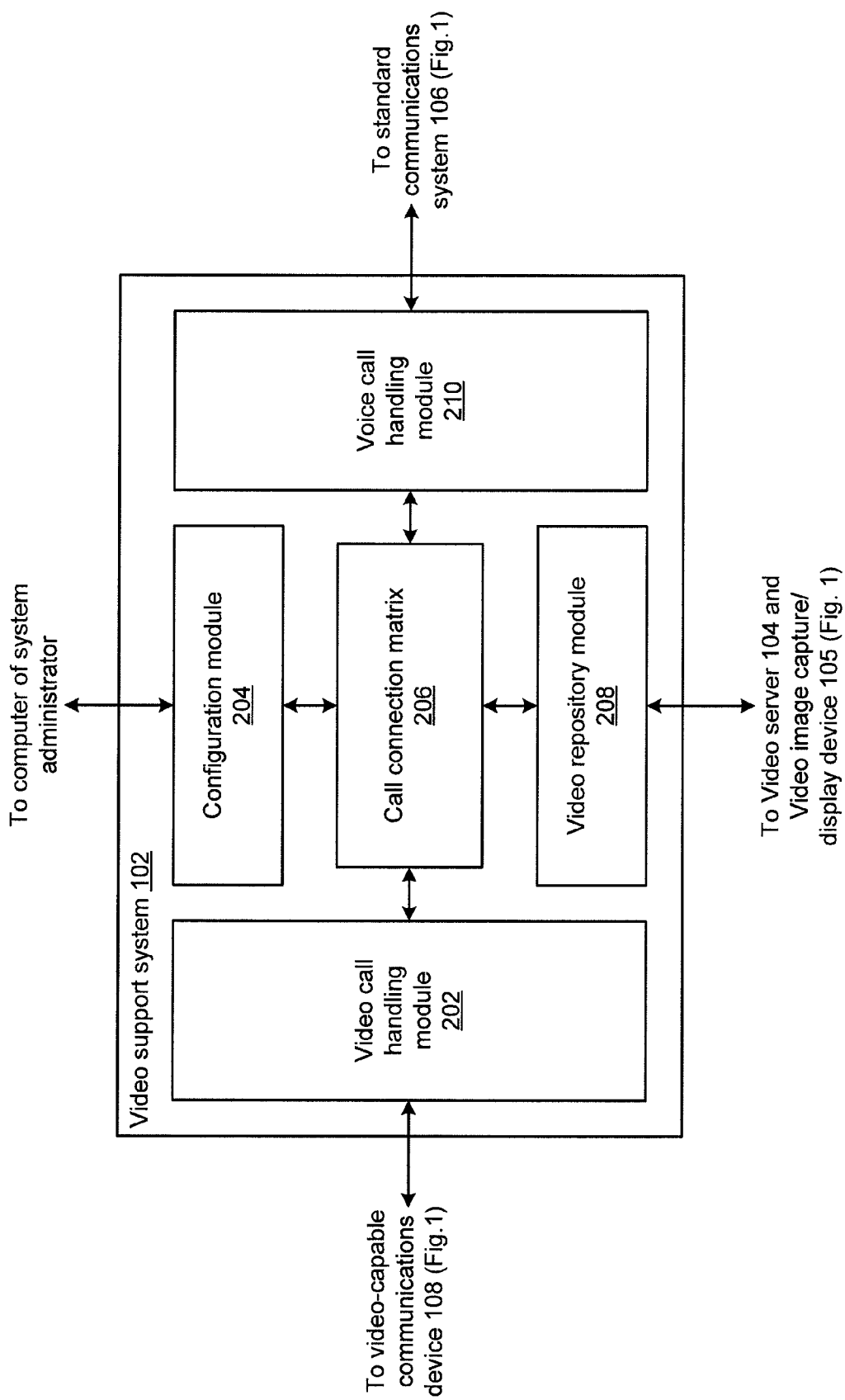
FIG. 2 is a block diagram of an exemplary architecture of the video support system of FIG. 1, according to an exemplary embodiment of the present application.

FIG. 2 depicts an exemplary architecture of the video support system 102 of FIG. 1. As shown in FIG. 2, the video support system 102 includes a video call handling module 202, a voice call handling module 210, a video repository module 208, a configuration module 204, and a call connection matrix 206 communicably coupled to each of the video call handling module 202, the voice call handling module 210, the video repository module 208, and the configuration module 204. The video call handling module 202 is communicably coupleable to the video-capable communications device 108 (see FIG. 1), and is operative to handle video calls initiated by or directed to the user of the video-capable communications device 108. The voice call handling module 210 is communicably coupleable to the standard communications system 106 (see FIG. 1), and is operative, in conjunction with the standard communications system 106, to handle voice calls initiated by or directed to the user of the standard communications device 110. For example, the voice call handling module 210 may be communicably coupled to the standard communications system 106 via a standard audio telephone interface, a SIP/RTP interface for VoIP, a T1, E1, ISDN BRI, or ISDN PRI interface, or any other suitable interface. The video repository module 208 is communicably coupleable to the video server 104 and/or the video image capture/display device 105 (see FIG. 1). The video repository module 208 is operative to access video content and any associated audio content stored in the video database 104.1, and to access video streams and any associated audio streams generated by the video image capture/display device 105. It is noted that each of the connections between the video repository module 208 and the video server 104, and between the video repository module 208 and the video image capture/display device 105, can be established as an IP (Internet Protocol) connection or any other suitable type of connection. The configuration module 204 is communicably coupleable to a suitably configured computer of a system administrator, or communicably coupleable via a local configuration tool (e.g., a configuration console or a command line tool). Using such a suitably configured computer, the system administrator can interact with the configuration module 204 to define the behavior of the video support system 102 in response to commands directed to it by the user of the video-capable communications device 108, the user of the standard communications device 110, and/or the standard communications system 106.

Figure 3:
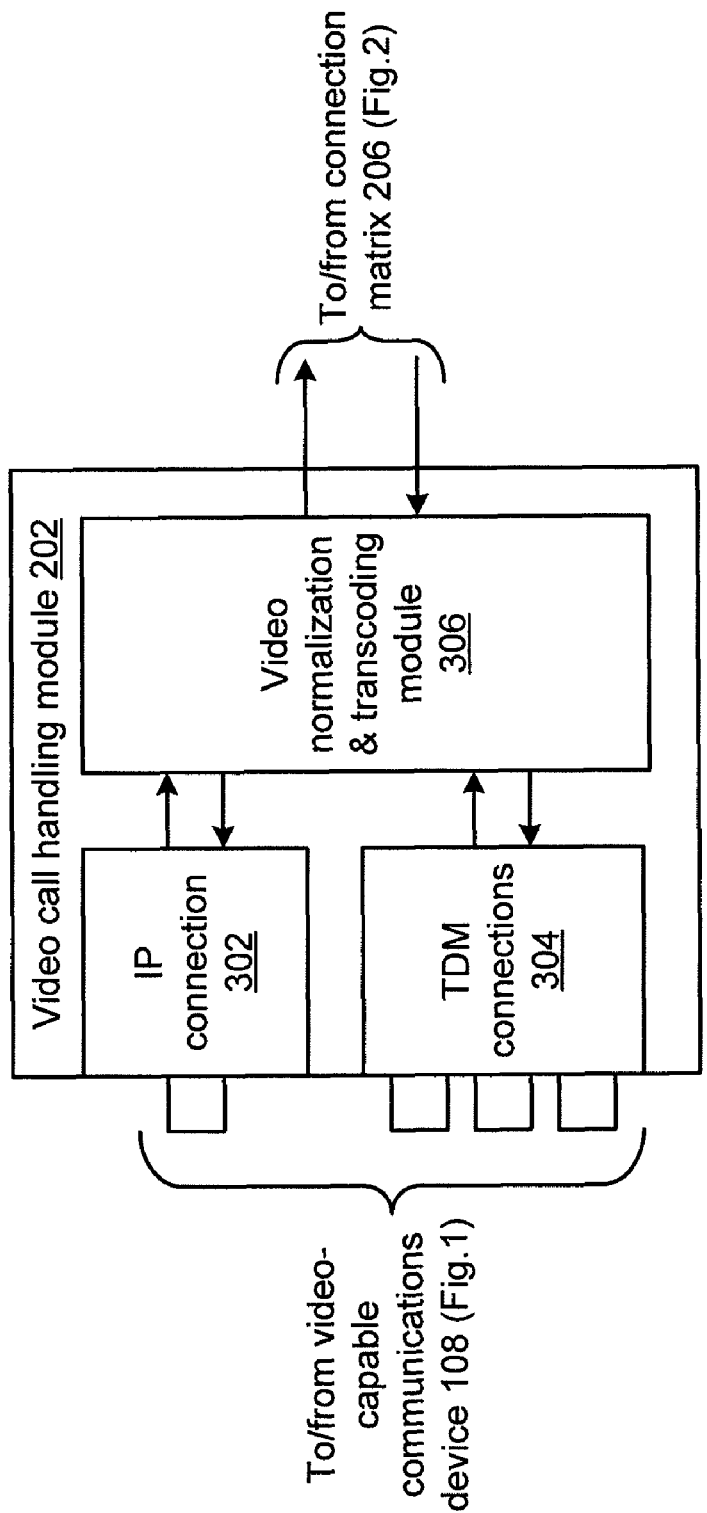
FIG. 3 is a block diagram of an exemplary video call handling module included in the video support system of FIG. 2.

FIG. 3 depicts an exemplary configuration of the video call handling module 202 shown in FIG. 2 and included in the video support system 102 of FIG. 1. As described above, the video call handling module 202 is operative to handle video calls initiated by or directed to the user of the video-capable communications device 108 (see FIG. 1). Such video calls may be implemented in accordance with a predetermined signaling protocol, such as SS7, H.323, SIP, or any other suitable signaling protocol. Further, because each video call may conform to one of multiple possible video formats, the video call handling module 202 generally includes a plurality of video interfaces operative to support a plurality of predetermined video formats. In accordance with this exemplary configuration, the plurality of video interfaces includes an IP (Internet Protocol) connection 302 established between the video support system 102 and the video-capable communications device 108, for supporting the SIP (Session Initiation Protocol) video format, the Skype video format, the Microsoft Office Communications Server video format, the Adobe Flash video format, the YouTube video format, the MPEG video format, the H.324 video format (also referred to as 3G-H.324M or 3G-324M), and/or any other suitable video format over the IP connection 302. The plurality of video interfaces further includes TDM (Time Division Multiplexing) connections 304 established between the video support system 102 and the video-capable communications device 108, for supporting an analog video format, the Integrated Services Digital Network Basic Rate Interface (ISDN-BRI) video format, the Integrated Services Digital Network Primary Rate Interface (ISDN-PRI) video format, the E1/T1/J1 video formats, and/or any other suitable video format over the TDM connections 304. It is noted that such IP and TDM connections 302, 304 between the video support system 102 and the video-capable communications device 108 may be established in conjunction with a suitable video service provider. The video call handling module 202 further includes a video normalization/transcoding module 306 communicably coupled to the respective IP and TDM connections 302, 304. The video normalization/transcoding module 306 is operative to perform video normalization and/or transcoding functions, as required, for processing of video calls within the video support system 102.

Figure 4:
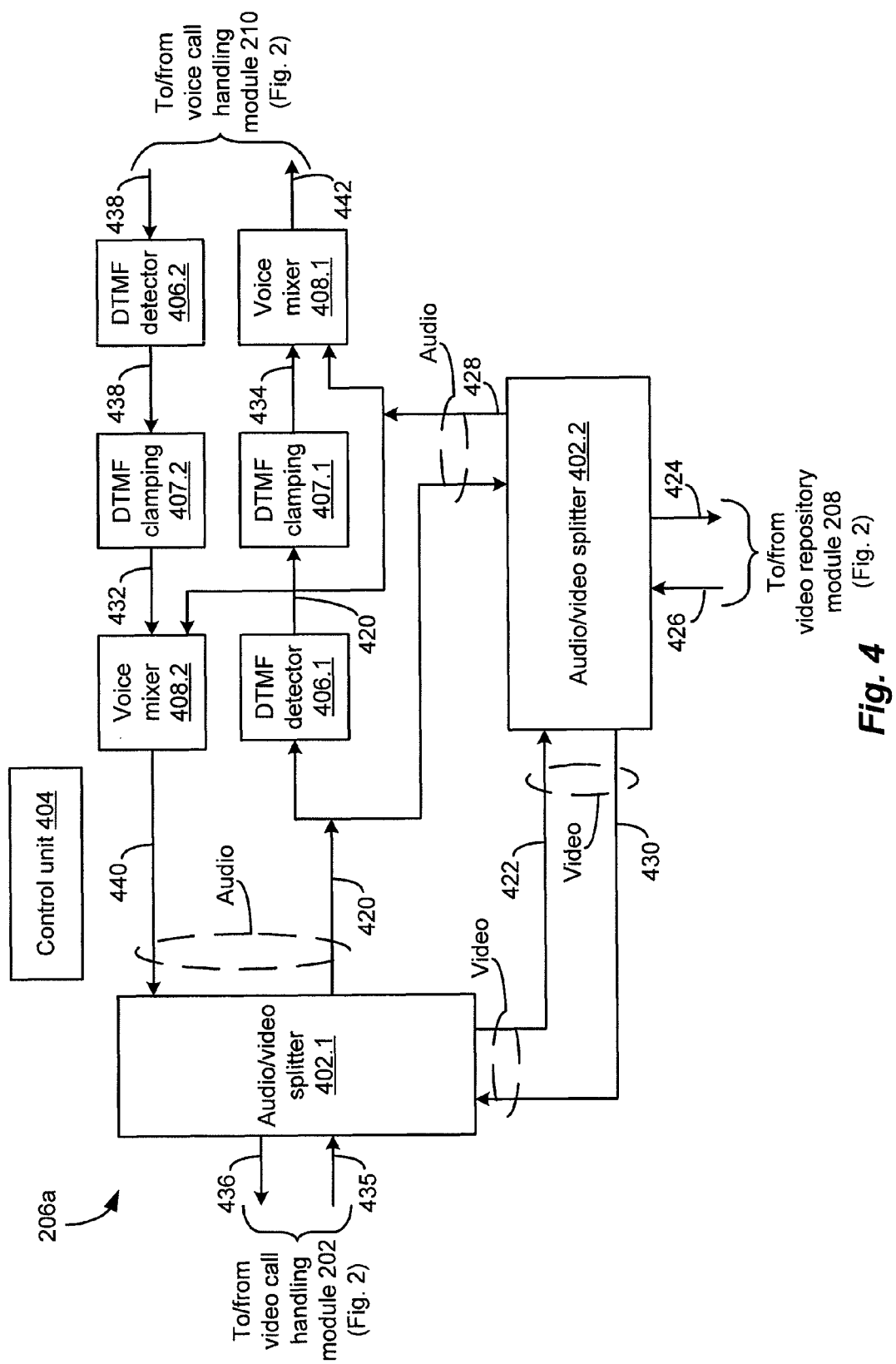
FIG. 4 is a block diagram of an exemplary call connection matrix included in the video support system of FIG. 2, for use in describing a first illustrative example of the video support system of FIG. 1.
Figure 5:
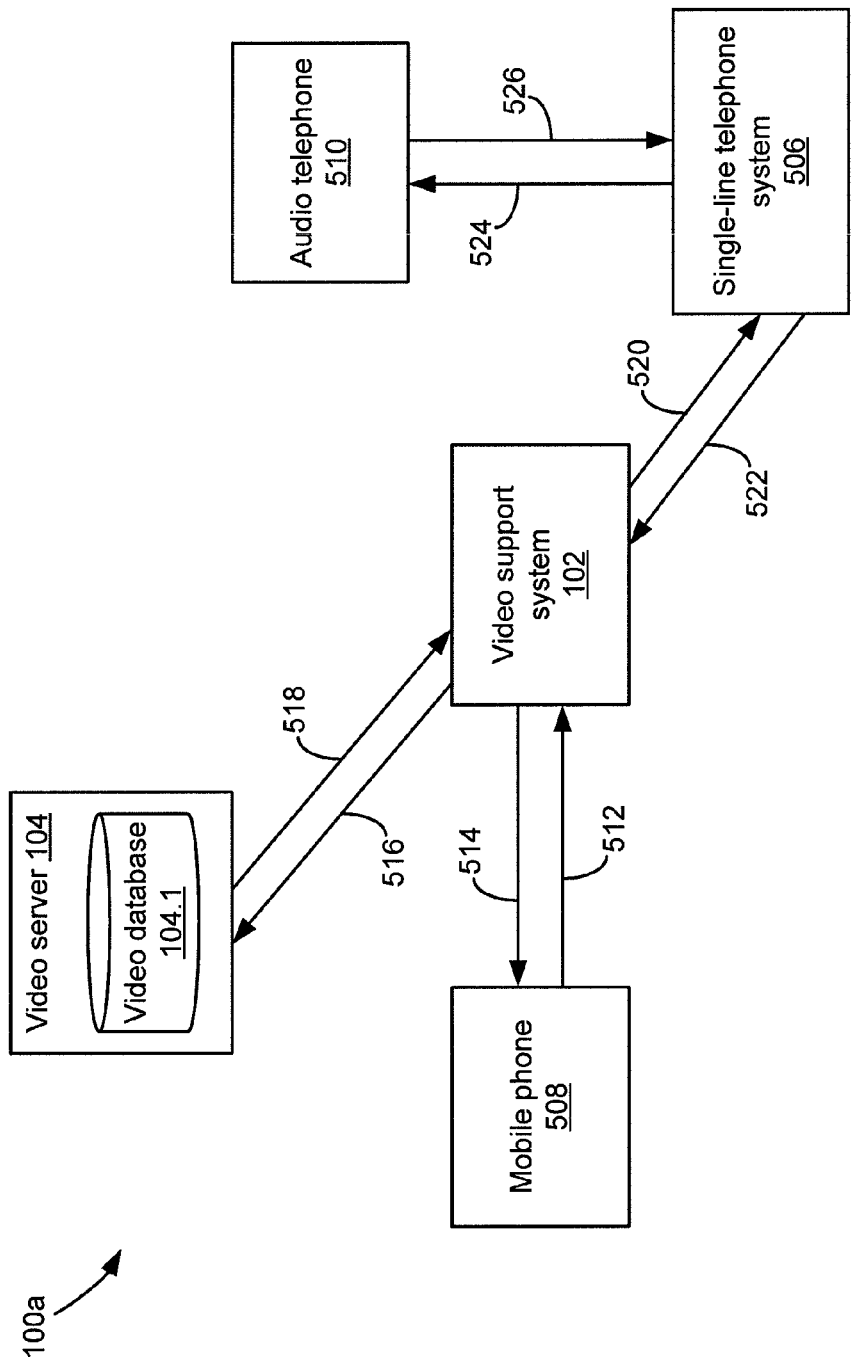
FIG. 5 is a block diagram of an exemplary alternative embodiment of the environment of FIG. 1, illustrating exemplary video channels and voice channels for establishing a connection for a call made by a user of a video-capable communications device to a user of a standard (i.e., non-video-capable) communications device, for use in describing the first illustrative example of the video support system, as illustrated in FIG. 4.
Figure 6:
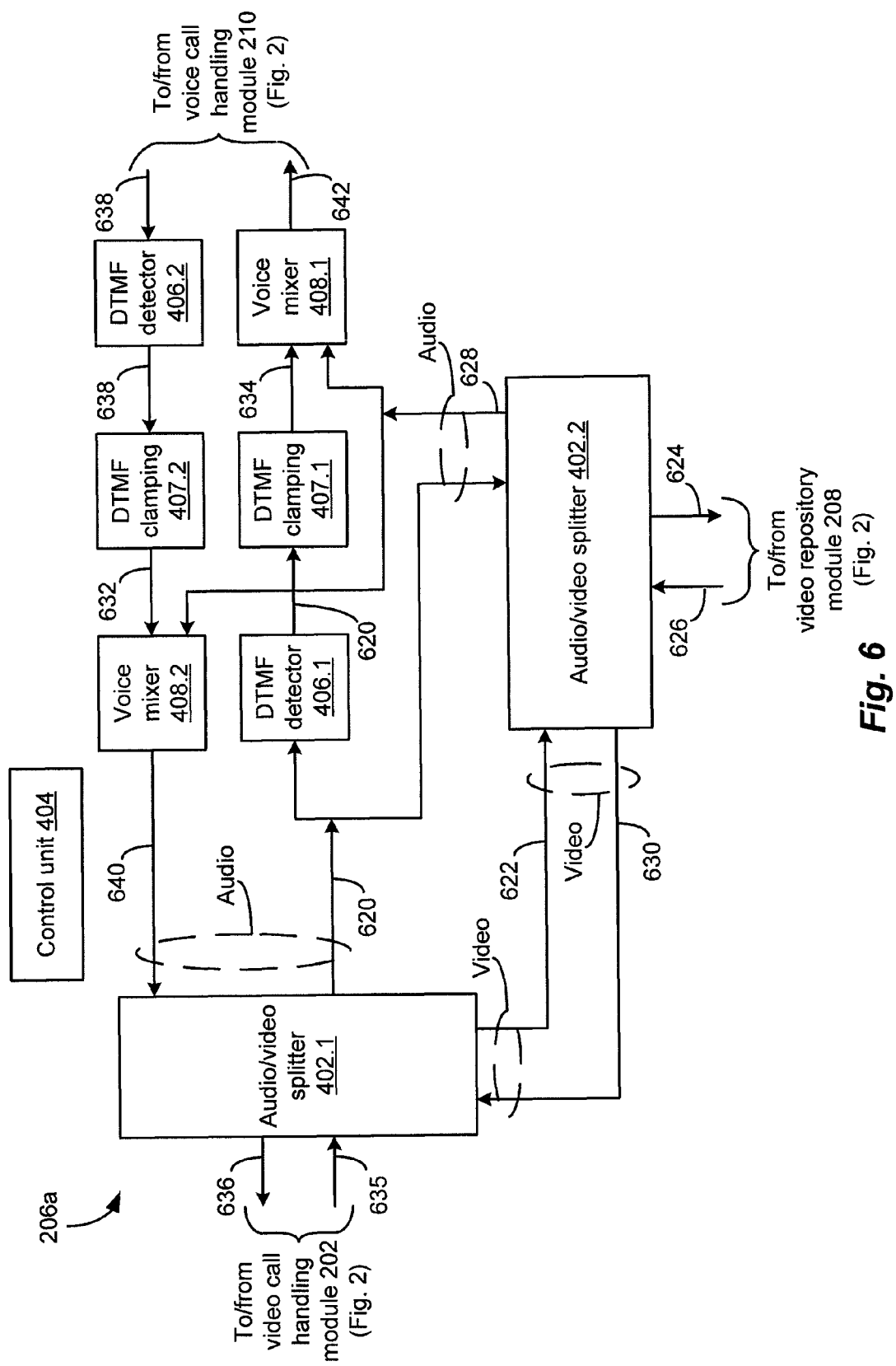
FIG. 6 is a block diagram of the exemplary call connection matrix of FIG. 4, for use in describing a second illustrative example of the video support system of FIG. 1.
Figure 7:
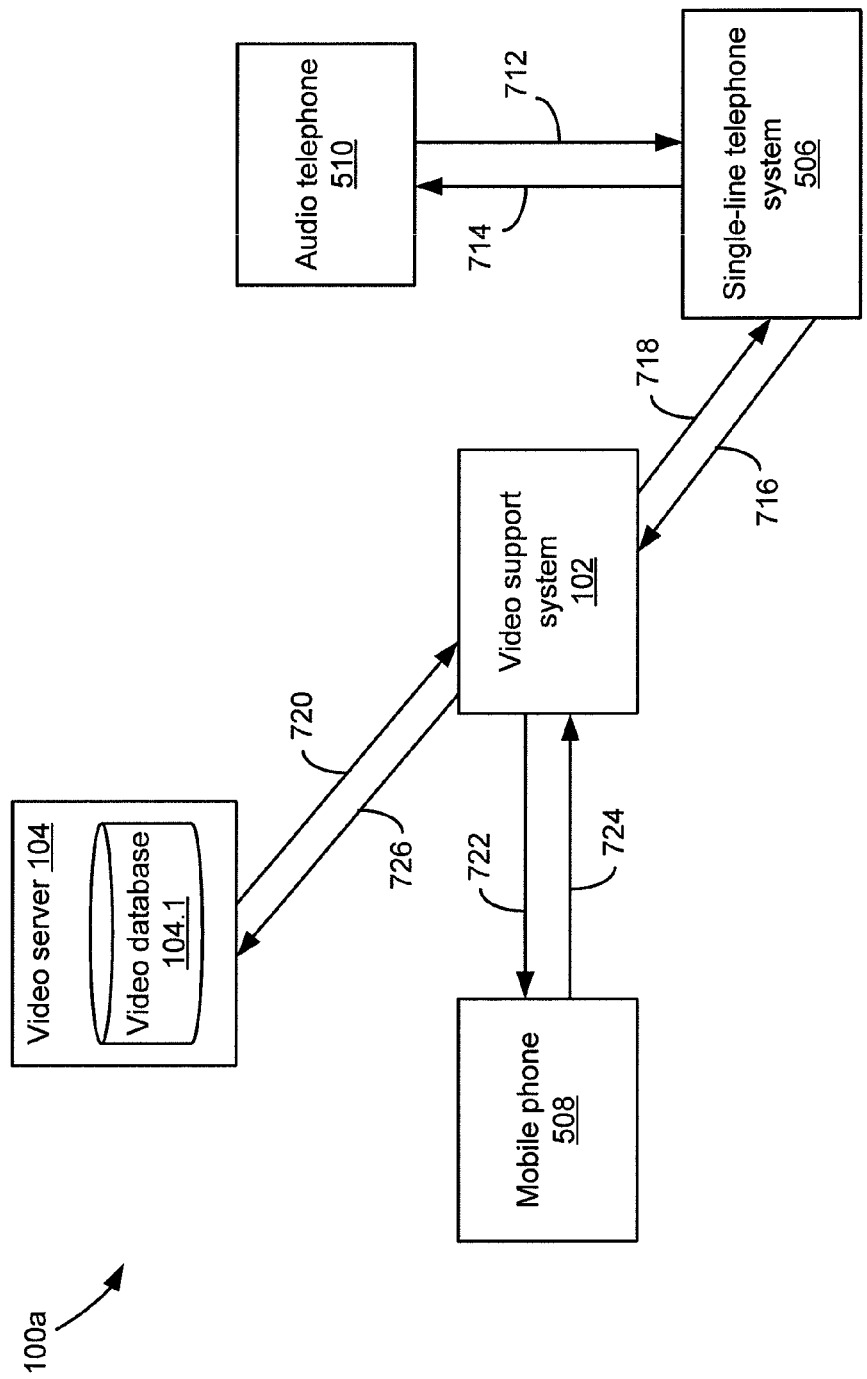
FIG. 7 is a block diagram of the exemplary alternative embodiment of the environment of FIG. 1, illustrating exemplary video channels and voice channels for establishing a connection for a call made by a user of a standard communications device to a user of a video-capable communications device, for use in describing the second illustrative example of the video support system, as illustrated in FIG. 6.

FIG. 4 depicts an exemplary configuration 206*a* of the call connection matrix 206 included in the video support system 102 (see FIGS. 1 and 2). As shown in FIG. 4, this exemplary configuration 206*a* includes a plurality of audio/video splitter components 402.1, 402.2, a programmable control unit 404, a plurality of DTMF detectors 406.1, 406.2, a plurality of DTMF clamping components 407.1, 407.2, and a plurality of audio or voice mixers 408.1, 408.2. The audio/video splitter components 402.1, 402.2 are operative to effectively split audio/video signals provided by the video call handling module 202 and the video repository module 208, respectively, to produce separate audio and video streams for processing within the video support system 102. The audio/video splitter components 402.1, 402.2 are further operative to combine separate audio and video streams to produce corresponding audio/video signals for subsequent handling by the voice call handling module 202 and the video repository module 208, respectively. The DTMF detector 406.1 is operative to detect commands (e.g., DTMF tones or tone sequences) initiated by the user of the video-capable communications device 108, and the DTMF detector 406.2 is operative to detect commands (e.g., DTMF tones or tone sequences) initiated by the user of the standard communications device 110 and/or the standard communications system 106.

The DTMF clamping component 407.1 is optional and may be employed, as desired or required, to remove the commands (e.g., DTMF tones or tone sequences) initiated by the user of the video-capable communications device 108 from audio streams provided by the video call handling module 202 to prevent the video support system 102 and the standard communications system 106 from receiving the tones or tone sequences. In accordance with one or more alternative embodiments, the DTMF clamping component 407.1 may be omitted, causing such commands (e.g., DTMF tones or tone sequences) initiated by the user of the video-capable communications device 108 to be passed substantially unchanged to the video support system 102 and/or the standard communications system 106, allowing the user to control the functionality of the video support system 102 and/or the standard communications system 106 via the respective commands. For example, the video support system 102 and/or the standard communications system 106 may detect or "hear" the DTMF tones or tone sequences from the video-capable communications device 108, and, in response to the DTMF tones or tone sequences, perform corresponding functions such as accessing certain video content from the video server 104, causing the video image capture/display device 105 to "zoom-in" or "zoom-out," etc. Similarly, the DTMF clamping component 407.2 is optional and may be employed, as desired or required, to remove any such commands (e.g., DTMF tones or tone sequences) initiated by the user of the standard communications device 110 and/or the standard communications system 106 from audio streams provided by the voice call handling module 210, thereby preventing the video-capable communications device 108 from receiving the tones and possibly disturbing the user of the video-capable communications device 108.

The voice mixer 408.1 is operative to mix and control the volume levels of audio signals provided by the voice call handling module 210, and audio signals associated with the video content accessed from the video database 104.1 and/or the video streams generated by the video image capture/display device 105. Similarly, the voice mixer 408.2 is operative to mix and control the volume levels of audio signals provided by the video call handling module 202, and audio signals associated with the video content accessed from the video database 104.1 and/or the video streams generated by the video image capture/display device 105. The programmable control unit 404 is operative to control the operation of the video call handling module 202, the voice call handling module 210, the video repository module 208, and the respective components contained in the call connection matrix 206, including the plurality of audio/video splitter components 402.1, 402.2, the plurality of DTMF detectors 406.1, 406.2, the plurality of DTMF clamping components 407.1, 407.2, and the plurality of voice mixers 408.1, 408.2. For example, the system administrator may program the control unit 404 by interacting with the configuration module 204 via a graphical user interface (GUI), a web interface, or any other suitable type of interface, for example, using a suitably configured computer operatively connected to the video support system 102. Further, the connection between the video support system 102 and the computer of the system administrator may be established as an IP connection or any other suitable type of connection. The system administrator may also program the control unit 404 via a local configuration file or a command line interface running on the same computer system as the video support system 102.

Figure 8:
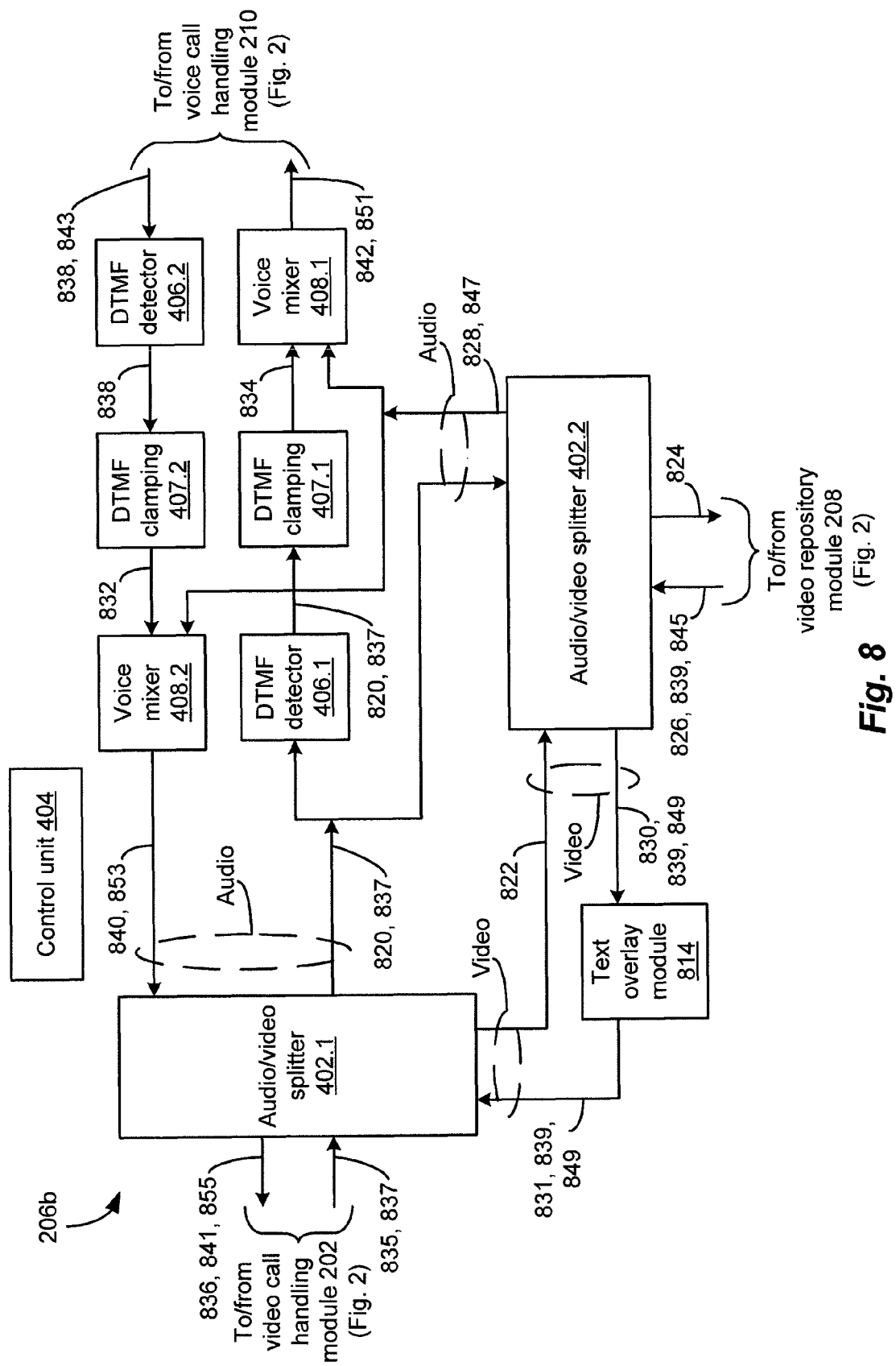
FIG. 8 is a block diagram of an exemplary alternative embodiment of the call connection matrix of FIG. 4, for use in describing a third illustrative example of the video support system of FIG. 1.
Figure 10:
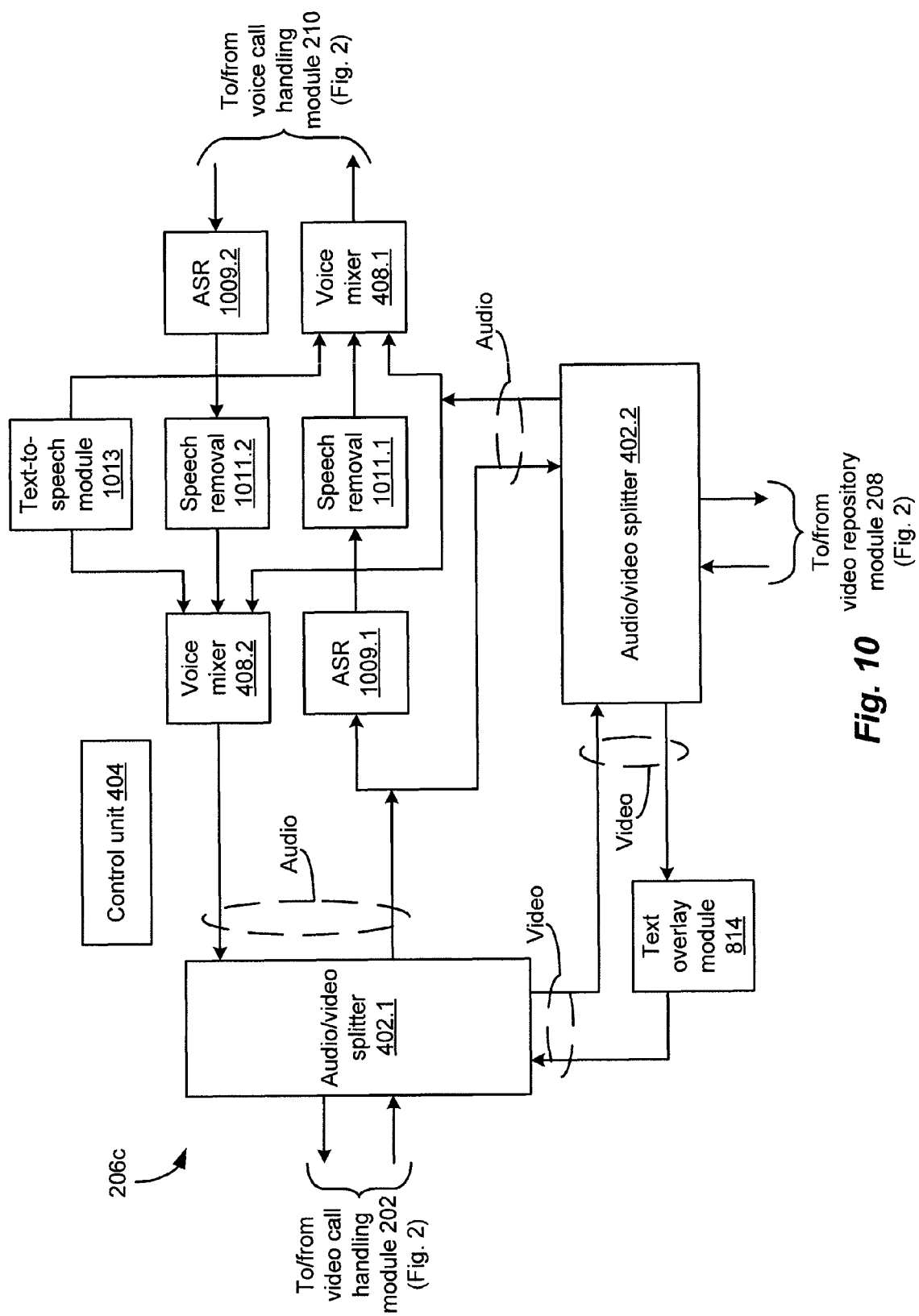
FIG. 10 is a block diagram of another exemplary alternative embodiment of the call connection matrix of FIG. 4.

In accordance with one or more exemplary alternative embodiments, the call connection matrix 206 may further include a text overlay module 814 (see FIG. 8), a text-to-speech module 1013 (see FIG. 10), one or more automatic speech recognition (ASR) components 1009.1, 1009.2 (see FIG. 10), and/or one or more speech removal components 1011.1, 1011.2 (see FIG. 10). In an exemplary configuration 206*b* (see FIG. 8), the text overlay module 814 is communicably coupled between the audio/video splitter component 402.1 and the audio/video splitter component 402.2. The text overlay module 814 is operative to receive a video stream from the audio/video splitter component 402.2, to insert legible video representations of text (e.g., a date, a time, a system warning, a menu of available user options, etc.) into the video stream, and to provide the video stream with the video representations of text to the audio/video splitter 402.1. For example, the inserted text may appear as an overlay on one or more video images viewable via the video output of the video-capable communications device 108. In an exemplary configuration 206*c* (see FIG. 10), the text-to-speech module 1013 is communicably coupled to the plurality of voice mixers 408.1, 408.2. Further, the ASR component 1009.1 and the speech removal component 1011.1 are communicably coupled in series between the audio/video splitter component 402.1 and the voice mixer 408.1. Similarly, the ASR component 1009.2 and the speech removal component 1011.2 are communicably coupled in series between the voice call handling component 210 and the voice mixer 408.2.

The ASR component 1009.1 is optional and may be employed, as desired or required, to detect commands (e.g., speech terms) generated by the user of the video-capable communications device 108, and provided to the ASR component 1009.1 via the video call handling module 202 and the audio/video splitter component 402.1. Similarly, the ASR component 1009.2 is optional and may be employed, as desired or required, to detect commands (e.g., speech terms) generated by the user of the standard communications device 110 and/or the standard communications system 106, and provided to the ASR component 1009.2 via the voice call handling module 210. The speech removal component 1011.1 is optional and operative to remove any such commands (e.g., speech terms) generated by the user of the video-capable communications device 108 from the audio stream to prevent the standard communications system 106 and the standard communications device 110 from receiving the speech terms. Similarly, the speech removal component 1011.2 is optional and operative to remove any such commands (e.g., speech terms) generated by the user of the standard communications device 110 to prevent the video-capable communications device 108 from receiving the speech terms. The programmable control unit 404 is operative to control the operation of the text overlay module 814 and the text-to-speech module 1013. For example, the control unit 404 may be programmed to direct the text-to-speech module 1013 to convert predefined text into one or more audible speech prompts for insertion into an audio, voice, or speech stream, and may direct the text overlay module 814 to insert one or more legible video representations of text into a video stream. The control unit 404 may also be programmed to control the operation of the ASR components 1009.1, 1009.2 and the speech removal components 1011.1, 1011.2, and to perform specific actions in response to certain commands detected by the ASR components 1009.1, 1009.2.

As described above with reference to FIG. 1, the video support system 102 is operative to receive and to act on commands initiated by the user of the video-capable communications device 108, commands initiated by the user of the standard communications device 110, and/or commands generated by the standard communications system 106, for controlling the audio/video outputs of the video-capable communications device 108. The configuration module 204 may be employed to define the behavior of the video support system 102 in response to any of the possible commands provided via the video-capable communications device 108, the standard communications device 110, and/or the standard communications system 106. It is noted that other uses of the configuration module 204 are also possible. For example, the configuration module 204 may also be employed to define, as desired or required, menu tree structures for use by the user of the video-capable communications device 108 and/or the user of the standard communications device 110, rules for accessing specified video content and any associated audio content from the video database 104.1, rules for accessing specified video streams and any associated audio streams from the video image capture/display device 105, and phone numbers for use in communicably linking together the video support system 102 and the standard communications system 106 in an operative fashion.

More specifically, the system administrator, using a suitably configured computer operatively connected to the video support system 102 or via a local configuration tool, can interact with the configuration module 204 to enter the names and/or locations of files containing the audio/video content stored in the video database 104.1, and to define the rules governing the access of certain audio/video content from the video database 104.1 for consumption (e.g., listening/viewing) by the user of the video-capable communications device 108. For example, at least some of the rules for accessing the audio/video content from the video database 104.1 may be based, at least in part, on a specified date, a specified time, the phone number of the called party or calling party, a predetermined command issued via the video-capable communications device 108, the standard communications device 110, and/or the standard communications system 106, etc. The system administrator can also employ the configuration module 204 to enter the parameters of the video image capture/display device 105, which may be employed to stream audio/video data to the video-capable communications device 108 via the video support system 102. The configuration module 204 can also be employed to define the rules governing the use of certain video cameras, for example, based on a specified date, a specified time, the phone number of the called party or calling party, a predetermined command issued via the video-capable communications device 108, the standard communications device 110, and/or the standard communications system 106, etc. With regard to such commands issued to the video support system 102, the system administrator can employ the configuration module 204 to define what DTMF tones or tone sequences and/or speech terms are supported by the video support system 102, the specific operations to be performed in response to predetermined commands (e.g., video zoom-in, video zoom-out, increase volume, decrease volume, go to previous video, go to next video, etc.), and the error messages to be issued in response to receipt of unsupported commands. For example, the video support system 102 may issue audible error messages to the standard communications device 110 to allow the user of that device 110 to hear the error messages, such as "unsupported key" or "unsupported command." Further, the video support system 102 may issue audible and/or viewable error messages to the video-capable communications device 108 to allow the user of that device 108 to listen to and/or view the error messages, such as "unsupported key" or "unsupported command."

As described above with reference to FIG. 2, the configuration module 204 may be employed to define, as desired or required, menu tree structures for use by the user of the video-capable communications device 108 and/or the user of the standard communications system 110. More specifically, the system administrator can employ the configuration module 204 to define a menu tree structure containing a predetermined number of options available to a user for performing specific actions, such as selecting a particular video clip for viewing, selecting a particular video camera for accessing streaming audio/video data, selecting a certain individual to contact in a company or an organization, etc. For example, the menu tree structure may be defined to allow the user of the video-capable communications device 108 and/or the user of the standard communications device 110 to navigate through the menu by pressing specified keys on the respective devices to generate corresponding DTMF tones or tone sequences, and/or by speaking specified speech terms. The various available menu options may be presented to the user of the video-capable communications device 108 as part of a video image, using the text overlay module 414. For example, the system administrator may employ the configuration module 204 to define a menu tree structure using pre-recorded videos and/or still pictures in a predetermined video format, such that the videos and/or still pictures contain representations of the menu tree structure. Further, a conditional statement may be associated with each such video and/or still picture, such as "If key '1' is pressed, then play video '1'," "If key '2' is pressed, then play video '2'," etc. Moreover, in the event the standard communications system 106 comprises an interactive voice response (IVR) system, the system administrator may interact with the configuration module 204 to define a menu tree structure that conforms to the behavior of the IVR. Such a menu tree structure can make navigation of the IVR system both faster and easier for a user, allowing the user to see video content and text overlays change with user input, and resulting in a more pleasant user experience.

As further described above, the configuration module 204 may be employed to define phone numbers for use in communicably linking together the video support system 102 and the standard communications system 106 in an operative fashion. To that end, the system administrator may interact with the configuration module 204 to enter expressions defining how certain phone numbers are to be converted to reach certain parties. Such conversions of phone numbers may include the addition of a predefined prefix to a phone number, such as the number "9", the number and symbol sequence "+49", or any other suitable number, symbol, or number and symbol sequence. For example, the standard communications system 106 configured as a PBX system may receive a call to a phone number with the prefix "9", recognize that the phone number corresponds to the video-capable communications device 108 based on the prefix "9", and route the call to the video support system 102 to establish a video call connection with the video-capable communications device 108. Alternatively, the standard communications system 106 configured as a PBX system may receive a call to a phone number without the prefix "9", recognize that the phone number corresponds to a non-video-capable communications device such as the standard communications device 110, and route the call to the standard communications device 110 to establish a voice call connection with the standard communications device 110, without involving the video support system 102. The configuration module 204 may also be employed to define other parameters and/or behaviors of the video support system 102 relating to, for example, the audio and/or video recording of conversations (if desired or required and legally permitted), the generation of log files, the generation of call tracing information, etc. In addition, the configuration module 204 may be employed to define parameters for the voice mixers 408.1, 408.2 when these components are used to mix and control the volume levels of audio signals provided by the voice and video call handling modules 210, 202, respectively, and other audio associated with video content accessed from the video database 104.1.

In accordance with the illustrative embodiment of FIG. 1, the video support system 102 may be configured to allow varying levels of control over the audio/video outputs of the video-capable communications device 108. In an exemplary first level of control, the video support system 102 is operative to provide at least partial control over the audio/video outputs of the video-capable communications device 108. In an exemplary second level of control, the video support system 102 can control the audio/video outputs of the video-capable communications device 108 while allowing the user of the video-capable communications device 108, the user of the standard communications device 110, and/or the standard communications system 106 to provide additional control over the audio/video outputs of the video-capable communications device 108. For example, the user of the video-capable communications device 108, the user of the standard communications device 110, and/or the standard communications system 106 may direct commands to the video support system 102 in the form of DTMF tones or tone sequences, for providing such additional control over the audio/video outputs of the video-capable communications device 108.

The presently disclosed systems and methods of providing video support for standard (i.e., non-video-capable) communications systems will be further understood with reference to the following illustrative examples and FIGS. 1 through 9. In accordance with a first illustrative example, the user of the video-capable communications device 108 makes a video call directed to the user of the standard communications device 110, using the video support system 102 (see FIGS. 1 and 2). For example, the video-capable communications device 108 may be a mobile phone 508 (see FIG. 5) or any other suitable video-capable communications device, and the standard communications device 110 may be an audio telephone 510 (see FIG. 5) or any other suitable non-video-capable communications device. Further, the standard communications system 106 communicably coupleable to the video support system 102 may comprise a single line telephone system 506 (see FIG. 5) or any other suitable non-video-capable communications system, and the user of the audio telephone 510 may be an individual in a private household, a workplace, or any other suitable location associated with a company or organization. Accordingly, this first illustrative example is described below with reference to an alternative embodiment 100a (see FIGS. 5 and 7) of the environment 100, in which the mobile phone 508 represents the video-capable communications device 108, the audio telephone 510 represents the standard communications device 110, and the single-line telephone system 506 represents the standard communications system 106. It is noted that, in the alternative embodiment 100a of the environment 100, the video image capture/display device 105 is omitted.

In accordance with this first illustrative example, the video support system 102 effectively operates as a video front end for the single line telephone system 506 to provide the above-described first level of control over the audio/video outputs of the mobile phone 508, during or otherwise in relation to a call with the audio telephone 510. Specifically, the user of the mobile phone 508 makes a video call directed to the user of the audio telephone 510 over a video channel 512 (see FIG. 5). The video call handling module 202 (see FIG. 2) within the video support system 102 receives the video call over the video channel 512. Specifically, based on the video format of the video call, the video call handling module 202 may receive the video call via the IP connection 302 (see FIG. 3) to establish an IP connection with the mobile phone 508, or via the TDM connections 304 (see FIG. 3) to establish TDM connections (video calls, e.g., using the 3G-H.324M protocol) with the mobile phone 508. Further, the video normalization/transcoding module 306 (see FIG. 3) within the video call handling module 202 may perform normalization/transcoding operations on the video call, as required, in the event the video support system 102 is configured to handle a video format that is different from the video format of the video call. The video call handling module 202 provides an answer to the video call over a video channel 514 (see FIG. 5), thereby establishing a video call connection over the video channels 512, 514 between the video support system 102 and the mobile phone 508.

In addition, the video call handling module 202 provides an audio/video stream 435 (see FIG. 4) for the video call to the audio/video splitter component 402.1, which derives an audio stream 420 and a video stream 422 from the audio/video stream 435. The audio/video splitter component 402.1 provides the audio stream 420 to the DTMF detector 406.1, and provides both the audio stream 420 and the video stream 422 to the audio/video splitter component 402.2. The DTMF detector 406.1 is operative to detect any possible commands (e.g., DTMF tones or tone sequences) that may be issued and injected into the audio stream 420 by the user of the mobile phone 508. The DTMF clamping component 407.1 receives the audio stream 420, removes commands used to control the video support system 102 and not used in the single-line telephone system 506 from the audio stream 420, and provides an audio stream 434 to the voice mixer 408.1. The audio/video splitter component 402.2 generates a combined audio/video stream 424 from the respective streams 420, 422, and provides the combined audio/video stream 424 to the video repository module 208 over a video channel 516 for recording of the audio/video stream 424 in the video database 104.1, if desired or required and legally permitted.

Moreover, the video call handling module 202 informs the control unit 404 of the video call made by the user of the mobile phone 508. In response to being informed of the video call, the control unit 404 instructs the video repository module 208 to access specified video content and any associated audio content from the video database 104.1 over a video channel 518. For example, the system administrator, interacting with the configuration module 204, may define certain rules governing the access of such specified audio/video content from the video database 104.1. In this first illustrative example, the specified audio/video content may comprise a video clip containing information about the private household, the workplace, or the location (at the company/organization) of the user of the audio telephone 510, or any other suitable information. The video repository module 208 provides an audio/video stream 426 containing the specified audio/video content (i.e., the video clip) to the audio/video splitter component 402.2, which derives an audio stream 428 and a video stream 430 from the audio/video stream 426. The audio/video splitter component 402.2 provides the video stream 430 to the audio/video splitter component 402.1, and provides the audio stream 428 to both the voice mixer 408.1 and the voice mixer 408.2. The voice mixer 408.1 mixes and controls the volume levels of the audio stream 428 from the video clip and the audio stream 434 from the DTMF clamping component 407.1, and generates a mixed audio stream 442. It is noted that at least part of the audio stream 434 can be generated from the voice of the user of the mobile phone 508. The voice mixer 408.2 receives the audio stream 428 from the video clip, and provides an audio stream 440 containing the audio stream 428 to the audio/video splitter component 402.1. The audio/video splitter component 402.1 generates a combined audio/video stream 436 from the audio stream 440 (which contains the audio from the video clip) and the video stream 430 (which contains the video from the video clip). The audio/video splitter component 402.1 provides the combined audio/video stream 436 to the video call handling module 202, which, in turn, provides the audio/video stream 436 to the mobile phone 508 over the video channel 514. In response to receipt of the combined audio/video stream 436 containing the audio/video from the video clip, the mobile phone 508 generates audio/video outputs for consumption (e.g., listening/viewing) of the video clip by the user of the mobile phone 508.

Once the video call connection is established between the mobile phone 508 and the video support system 102, the video support system 102 makes a voice call to the single line telephone system 506. To that end, the voice mixer 408.1 provides the mixed audio stream 442 to the voice call handling module 210, which makes the voice call to the single line telephone system 506 over a voice channel 520. The single line telephone system 506 provides an answer to the voice call over a voice channel 522, thereby establishing a voice call connection over the voice channels 520, 522 between the video support system 102 and the single line telephone system 506. In addition, the single line telephone system 506 makes a voice call—over a voice channel 524—to the user of the audio telephone 510, which provides an answer to the voice call over a voice channel 526, thereby establishing a voice call connection over the voice channels 524, 526 between the single line telephone system 506 and the audio telephone 510. It is noted that the call connection matrix 206 is operative to complete a call between the mobile phone 508 and the audio telephone 510 over the respective video and voice call connections.

Once the voice call connections are established between the single line telephone system 506 and the audio telephone 510, and between the video support system 102 and the single line telephone system 506, the video support system 102 may send an audible prompt to the audio telephone 510 to notify the user of the audio telephone 510 of the video-supported call. Further, the video support system 102 can receive audio streams, such as an audio stream 438, provided by the audio telephone 510 over the voice channels 526, 522. The voice call handling module 210 within the video support system 102 receives the audio stream 438, and provides the audio stream 438 to the DTMF detector 406.2, which detects any possible commands (e.g., DTMF tones or tone sequences) that may be issued and injected into the audio stream 438 by the user of the audio telephone 510. The DTMF detector 406.2 forwards the audio stream 438 to the DTMF clamping component 407.2, which removes any such possible commands (e.g., DTMF tones or tone sequences) from the audio stream 438, and provides an audio stream 432 to the voice mixer 408.2. The voice mixer 408.2 mixes and controls the volume levels of the audio stream 432 from the audio telephone 510, and the audio stream 428 containing the audio from the video clip, and provides the mixed audio stream 440 to the audio/video splitter component 402.1. It is noted that at least part of the audio stream 432 can be generated from the voice of the user of the audio telephone 510. The audio/video splitter component 402.1 generates the combined audio/ video stream 436 from the mixed audio stream 440 and the video stream 430, and provides the combined audio/video stream 436 to the mobile phone 508 over the video channel 514.

As a result, the user of the mobile phone 508 can view the video from the video clip via the video output, e.g., a display, of the mobile phone 508 while listening to the voice of the user of the audio telephone 510 via the audio output, e.g., a speaker, of the mobile phone 508. The user of the mobile phone 508 can also listen to the audio from the video clip mixed with the voice of the user of the audio telephone 510, depending on the controlled volume levels of the respective audio signals. In addition, the user of the audio telephone 510 can listen to the audio from the video clip mixed with the voice of the user of the mobile phone 508, depending on the controlled volume levels of these respective audio signals.

In accordance with a second illustrative example, the user of the standard communications device 110 makes a call to the user of the video-capable communications device 108, using the video support system 102. As described above with reference to the first illustrative example, the video-capable communications device 108 may be the mobile phone 508 or any other suitable video-capable communications device, and the standard communications device 110 may be the audio telephone 510 or any other suitable non-video-capable communications device. Further, the standard communications system 106 may be the single line telephone system 506 or any other suitable non-video-capable communications system, and the user of the audio telephone 510 may be an individual in a private household, a workplace, or any other suitable location associated with a company or organization. Accordingly, this second illustrative example is described below with reference to the alternative embodiment 100a (see FIGS. 5 and 7) of the environment 100, in which the mobile phone 508 represents the video-capable communications device 108, the audio telephone 510 represents the standard communications device 110, and the single-line telephone system 506 represents the standard communications system 106.

As in the first illustrative example described above, the video support system 102 in this second illustrative example provides the first level of control over the audio/video outputs of the mobile phone 508 during or otherwise in relation to a call with the user of the audio telephone 510. Specifically, the user of the audio telephone 510 makes a voice call directed to the user of the mobile phone 508 over a voice channel 712 (see FIG. 7). The single line telephone system 506 receives the voice call over the voice channel 712, and provides an answer to the voice call over a voice channel 714 to establish a voice call connection over the voice channels 712, 714 between the single line telephone system 506 and the audio telephone 510. Once the voice call connection is established between the single line telephone system 506 and the audio telephone 510, the single line telephone system 506 makes a voice call over a voice channel 716 to the video support system 102. The voice call handling module 210 within the video support system 102 receives the voice call over the voice channel 716, and provides an answer to the voice call over a voice channel 718, thereby establishing a voice call connection over the voice channels 716, 718 between the video support system 102 and the single line telephone system 506.

In addition, the voice call handling module 210 provides an audio stream 638 (see FIG. 6) for the voice call to the DTMF detector 406.2, which detects any possible commands (e.g., DTMF tones or tone sequences) that may be issued and injected into the audio stream 638 by the user of the audio telephone 510. The DTMF detector 406.2 forwards the audio stream 638 to the DTMF clamping component 407.2, which removes any such possible commands (e.g., DTMF tone sequences) from the audio stream 638, and provides an audio stream 632 to the voice mixer 408.2. The voice call handling module 210 also informs the control unit 404 of the voice call made by the user of the audio telephone 510. In response to being informed of the voice call, the control unit 404 instructs the video repository module 208 to access specified video content and any associated audio content stored in the video database 104.1 over a video channel 720. As in the first illustrative example described above, in accordance with this second illustrative example, the system administrator, interacting with the configuration module 204, may define certain rules governing the access of such specified audio/video content from the video database 104.1. For example, the specified audio/video content may comprise the video clip containing information about the private household, the workplace, or the location (at the company/organization) of the user of the audio telephone 510, or any other suitable information.

The video repository module 208 provides an audio/video stream 626 containing the specified audio/video content (i.e., the video clip) to the audio/video splitter component 402.2, which derives an audio stream 628 and a video stream 630 from the video clip, provides the video stream 630 to the audio/video splitter component 402.1, and provides the audio stream 628 to both the voice mixer 408.1 and the voice mixer 408.2. The voice mixer 408.2 mixes and controls the volume levels of the audio stream 628 from the video clip and the audio stream 632 provided by the DTMF clamping component 407.2, and generates a mixed audio stream 640. It is noted that at least part of the audio stream 632 can be generated from the voice of the user of the audio telephone 510. The voice mixer 408.1 receives the audio stream 628 from the video clip, and provides an audio stream 642 containing the audio from the video clip to the voice call handling module 210. The voice mixer 408.2 provides the mixed audio stream 640 to the audio/video splitter component 402.1, which generates a combined audio/video stream 636 from the mixed audio stream 640 (which contains the audio from the video clip) and the video stream 630 (which contains the video from the video clip). The audio/video splitter component 402.1 provides the combined audio/video stream 636 to the video call handling module 202, which makes a video call to the mobile phone 508 over a video channel 722. The mobile phone 508 provides an answer to the video call over a video channel 724, thereby establishing a video call connection over the video channels 722, 724 between the video support system 102 and the mobile phone 508. Once the video call connection is established between the video support system 102 and the mobile phone 508, the video call handling module 202 provides the combined audio/video stream 636 to the mobile phone 508 over the video channel 722. In response to receipt of the combined audio/video stream 636 containing the audio and the video from the video clip, the mobile phone 508 generates audio/video outputs for consumption (e.g., listening/viewing) of the video clip by the user of the mobile phone 508.

Moreover, the video call handling module 202 provides an audio/video stream 635 for the video call to the audio/video splitter component 402.1, which derives an audio stream 620 and a video stream 622 from the audio/video stream 635. The audio/video splitter component 402.1 provides the audio stream 620 to the DTMF detector 406.1, and provides both the audio stream 620 and the video stream 622 to the audio/video splitter component 402.2. The DTMF detector 406.1 is operative to detect any possible commands (e.g., DTMF tones or tone sequences) that may be issued and injected into the audio stream 620 by the user of the mobile phone 508, and to forward the audio stream 620 to the DTMF clamping component 407.1. The DTMF clamping component 407.1 is operative to remove any such possible commands from the audio stream 620, and to provide an audio stream 634 to the voice mixer 408.1. It is noted that at least part of the audio stream 634 can be generated from the voice of the user of the mobile phone 508. The audio/video splitter component 402.2 generates a combined audio/video stream 624 from the respective streams 620, 622, and provides the combined audio/video stream 624 to the video repository module 208 over a video channel 726 for recording of the audio/video stream 624 in the video database 104.1, if desired or required and legally permitted.

As a result, the user of the mobile phone 508 can view the video from the video clip on the display of the mobile phone 508 while listening to the voice of the user of the audio telephone 510 via the speaker of the mobile phone 508. The user of the mobile phone 508 can also listen to the audio from the video clip mixed with the voice of the user of the audio telephone 510, depending on the controlled volume levels of the respective audio signals. In addition, the user of the audio telephone 510 can listen to the audio from the video clip mixed with the voice of the user of the mobile phone 508, depending on the controlled volume levels of these respective audio signals.

In accordance with a third illustrative example, the video support system 102 provides the above-described second level of control over the audio/video outputs of the video-capable communications device 108, during or otherwise in relation to a call with the standard communications device 110. In this third illustrative example, the video-capable communications device 108 may be the mobile phone 508 or any other suitable video-capable communications device, and the standard communications device 110 may be the audio telephone 510 or any other non-video-capable communications device. For example, the audio telephone 510 may be one of several audio telephones. Further, the standard communications system 106 communicably coupleable to the video support system 102 may comprise a call center 906 (see FIG. 9) or any other suitable non-video-capable communications system. In this third illustrative example, the video support system 102 effectively operates as a video front end for the call center 906 to provide the second level of control over the audio/video outputs of the mobile phone 508. The user of the mobile phone 508 can interact with the call center 906, via a predefined menu tree structure, by issuing commands (e.g., DTMF tones or tone sequences) and directing the commands to the video support system 102. The user of the audio telephone 510 can also issue commands (e.g., DTMF tones or tone sequences) to the video support system 102 via the call center 906. Accordingly, this third illustrative example is described below with reference to an alternative embodiment 100b (see FIG. 9) of the environment 100, in which the mobile phone 508 represents the video-capable communications device 108, the audio telephone 510 represents the standard communications device 110, and the call center 906 represents the standard communications system 106.

Figure 9:
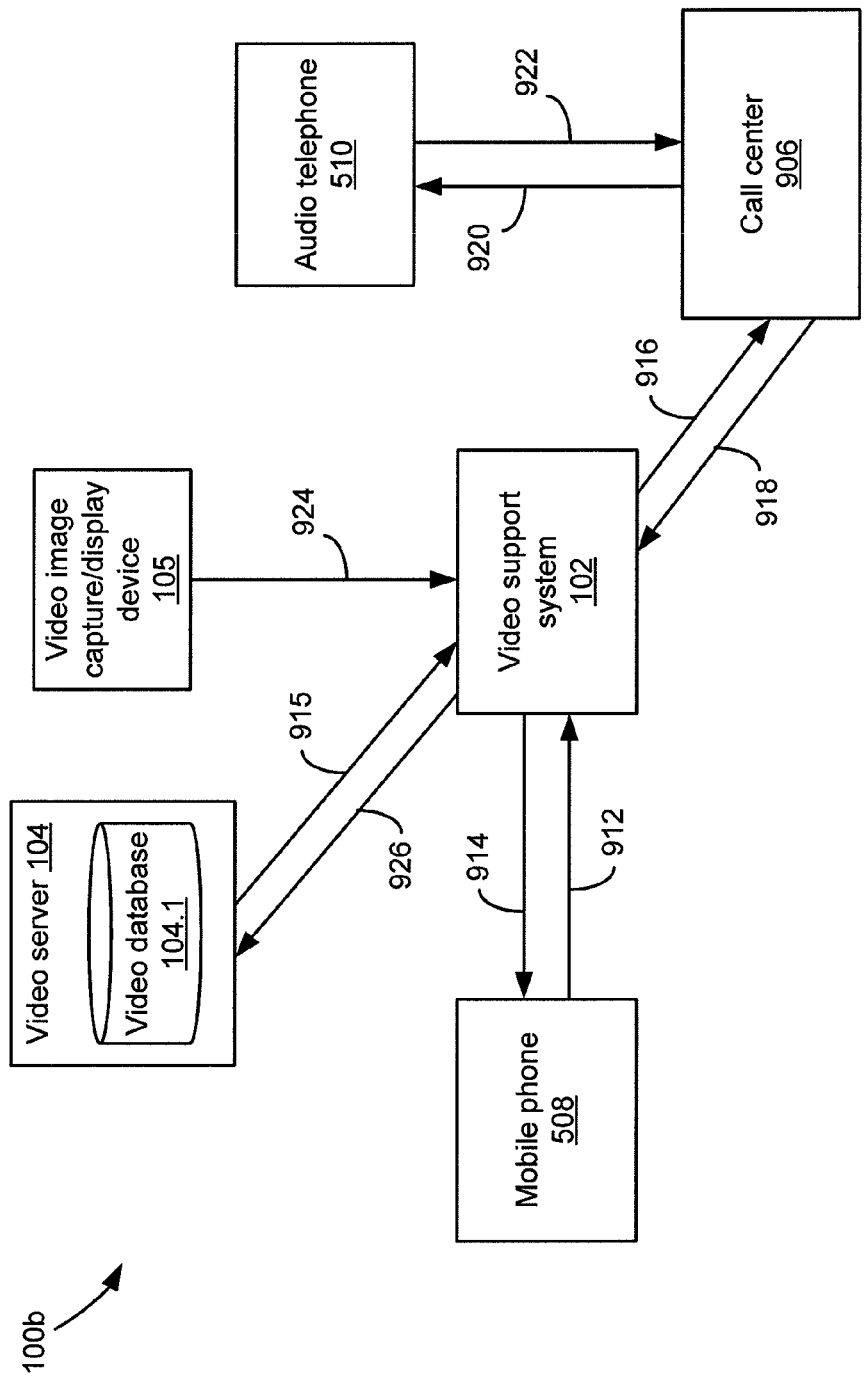
FIG. 9 is a block diagram of another exemplary alternative embodiment of the environment of FIG. 1, illustrating exemplary video channels and voice channels for establishing a connection for a call made by a user of a video-capable communications device to a user of a standard communications device, for use in describing the third illustrative example of the video support system, as illustrated in FIG. 8.

In accordance with this third illustrative example, the user of the mobile phone 508 makes a video call directed to the call center 906 over a video channel 912 (see FIG. 9). The video call handling module 202 within the video support system 102 receives the video call over the video channel 912, and provides an answer to the video call over a video channel 914, thereby establishing a video call connection over the video channels 912, 914 between the mobile phone 508 and the video support system 102. Further, the video call handling module 202 provides an audio/video stream 835 (see FIG. 8) for the video call to the audio/video splitter component 402.1, which derives an audio stream 820 and a video stream 822 from the audio/video stream 835, provides the audio stream 820 to the DTMF detector 406.1, and provides both the audio stream 820 and the video stream 822 to the audio/video splitter component 402.2. The DTMF detector 406.1 is operative to detect possible commands (e.g., DTMF tones or tone sequences) issued and injected into the audio stream 820 by the user of the mobile phone 508. The DTMF detector 406.1 provides the audio stream 820 to the DTMF clamping component 407.1, which removes any such possible commands (e.g., DTMF tones or tone sequences) issued by the user of the mobile phone 508 from the audio stream 820, and provides an audio stream 834 to the voice mixer 408.1. The audio/video splitter component 402.2 generates a combined audio/video stream 824 from the respective audio and video streams 820, 822, and provides the combined audio/video stream 824 to the video repository module 208 for recording of the audio/video stream 824 in the video database 104.1, if desired or required and legally permitted.

In addition, the video call handling module 202 informs the control unit 404 of the video call made by the user of the mobile phone 508. In response to being informed of the video call, the control unit 404 instructs the video repository module 208 to access specified video content and any associated audio content stored in the video database 104.1 over a video channel 915. For example, the system administrator, interacting with the configuration module 204, may define certain rules governing the access of such specified audio/video content from the video database 104.1. In this third illustrative example, the specified audio/video content may comprise a video clip welcoming the user of the mobile phone 508 to the call center 906. The video repository module 208 provides an audio/video stream 826 containing the specified audio/video content (i.e., the video clip) to the audio/video splitter component 402.2, which derives an audio stream 828 and a video stream 830 from the audio/video stream 826, provides the video stream 830 to the text overlay module 814 (see FIG. 8), and provides the audio stream 828 to both the voice mixer 408.1 and the voice mixer 408.2. The voice mixer 408.2 receives the audio stream 828 containing the audio from the video clip, and provides an audio stream 840 to the audio/video splitter component 402.1. The voice mixer 408.1 receives the audio stream 828 containing the audio from the video clip and the audio stream 834 from the DTMF clamping component 407.1, mixes and controls the volume levels of the audio streams 828, 834, and generates a mixed audio stream 842. It is noted that at least part of the audio stream 834 can be generated from the voice of the user of the mobile phone 508.

The text overlay module 814 receives the video stream 830, and inserts into the video stream 830 a legible video representation of text corresponding to a menu tree structure containing a predetermined number of options available to the user of the mobile phone 508, thereby effectively overlaying the text for the available menu options over video images from the video clip. For example, such available menu options may include "Press '1' for Marketing," "Press '2' for Sales," "Press '3' for Support Services," etc., or any other suitable menu options. Further, the system administrator, interacting with the configuration module 204, may define the menu tree structure containing the available menu options to conform to the specific requirements of the call center 906. The text overlay module 514 provides a video stream 831 (which contains the text for the available menu options overlaid onto the video images from the video clip) to the audio/ video splitter component 402.1, which generates a combined audio/video stream 836 from the video stream 831 and the audio stream 840 (which contains the audio from the video clip). The audio/video splitter component 402.1 provides the combined audio/video stream 836 to the video call handling module 202, which, in turn, provides the combined audio/video stream 836 to the mobile phone 508 over the video channel 914. In response to receipt of the audio/video stream 836, the mobile phone 508 generates audio/video outputs for consumption (e.g., listening/viewing) of the video clip and the available menu options by the user of the mobile phone 508. As a result, the user of the mobile phone 508 can view the video from the video clip and the text for the available menu options on the display of the mobile phone 508, while listening to the audio from the video clip via the speaker of the mobile phone 508.

After viewing the video clip and the available menu options on the display of the mobile phone 508, the mobile phone user selects one of the available menu options, and presses a key on the mobile phone 508 corresponding to the selected option, such as the 1, 2, or 3 key, causing a command comprising the DTMF tone(s) for the depressed key to be issued and injected into an audio stream 837 over the video channel 912. The video call handling module 202 within the video support system 102 receives the audio stream 837 containing the command over the video channel 912, and provides the audio stream 837 to the audio/video splitter component 402.1, which forwards the audio stream 837 to the DTMF detector 406.1. The DTMF detector 406.1 receives the audio stream 837 containing the command, detects the DTMF tone(s) for the depressed key within the command, and informs the control unit 404 of the identity of the key pressed by the user of the mobile phone 508 based on the detected DTMF tone(s). In response to being informed of the identity of the depressed key (i.e., the 1, 2, or 3 key), the control unit 404 instructs the voice call handling module 210 to make a voice call to an appropriate individual on one of the audio telephones, namely, the audio telephone 510. Specifically, the voice call handling module 210 makes a voice call, including an indication of the identity of the depressed key (i.e., the 1, 2, or 3 key), to the call center 906 over a voice channel 916. The call center 906 provides an answer to the voice call over a voice channel 918, thereby establishing a voice call connection over the voice channels 916, 918 between the video support system 102 and the call center 906. In addition, the call center 906 makes a voice call, over a voice channel 920, to the appropriate individual on the audio telephone 510 based on the identity of the depressed key. The audio telephone 510 provides an answer to the voice call over a voice channel 922. For example, the individual on the audio telephone 510 may be the marketing representative if the depressed key corresponds to the 1 key, the sales representative if the depressed key corresponds to the 2 key, or the support services representative if the depressed key corresponds to the 3 key.

Once the voice call connection is established between the video support system 102 and the call center 906, the video support system 102 can receive audio streams produced by the audio telephone 510 over the voice channels 922, 918. Specifically, the voice call handling module 210 within the video support system 102 provides an audio stream 838 (see FIG. 8) produced by the audio telephone 510 to the DTMF detector 406.2, which, in turn, provides the audio stream 838 to the DTMF clamping component 407.2. The DTMF clamping component 407.2 receives the audio stream 838, and provides an audio stream 832 to the voice mixer 408.2. The voice mixer 408.2 mixes and controls the volume levels of the audio stream 832 and the audio stream 828 from the video clip, and generates the mixed audio stream 840. It is noted that at least part of the audio stream 832 can be generated from the voice of the user of the audio telephone 510. The voice mixer 408.2 provides the mixed audio stream 840 to the audio/video splitter component 402.1.

In addition, the voice call handling module 210 informs the control unit 404 of the voice call with the marketing, sales, or support services representative on the audio telephone 510. In response to being informed of the voice call, the control unit 404 instructs the video repository module 208 to stop accessing the specified audio/video content from the video database 104.1 over the video channel 915, and to begin accessing video streams generated by the video image capture/display device 105 over a video channel 924. In this third illustrative example, the video image capture/display device 105 is directed toward the representative on the audio telephone 510. The video image capture/display device 105 provides a video stream 839 containing video images of the representative on the audio telephone 610 to the audio/video splitter component 402.2, which provides the video stream 839 to the text overlay module 814. The text overlay module 814 forwards the video stream 839 to the audio/video splitter component 402.1, which generates a combined audio/video stream 841 from the audio stream 840 (containing the voice of the representative on the audio telephone 510) and the video stream 839 (containing the video images of the representative on the audio telephone 510). The audio/video splitter component 402.1 provides the combined audio/video stream 841 to the video call handling module 202, which provides the audio/video stream 841 to the mobile phone 508 over the video channel 914. As a result, instead of viewing the video from the video clip, the user of the mobile phone 508 can now view, on the display of the mobile phone 508, live streaming video of the marketing, sales, or support services representative on the audio telephone 510, while listening to the voice of the representative on the audio telephone 510 via the speaker of the mobile phone 508.

In addition, the marketing, sales, or support services representative on the audio telephone 510 can control the audio/video outputs of the mobile phone 508, during the call with the user of the mobile phone 508. For example, the user of the mobile phone 508 may ask the representative on the audio telephone 510 to provide certain information on a particular product or service. In response to the request of the user of the mobile phone 508, the representative on the audio telephone 510 can press a predefined key or predefined sequence of keys on the audio telephone 510 corresponding to the requested information, causing a command comprising the DTMF tone(s) or tone sequence for the depressed key(s) to be issued and injected into an audio stream 843 over the voice channel 922. The call center 906 receives the audio stream 843 containing the command over the voice channel 922, and forwards the audio stream 843 to the video support system 102 over the voice channel 918. The voice call handling module 210 within the video support system 102 receives the audio stream 843 over the voice channel 918, and provides the audio stream 843 to the DTMF detector 406.2. The DTMF detector 406.2 detects the DTMF tone(s) or tone sequence within the command, and informs the control unit 404 of the respective command. In response to being informed of the command, the control unit 404 instructs the video repository module 208 to stop accessing the video streams generated by the video image capture/display device 105 over the video channel 924, and to begin accessing specified audio/video content relating to the requested product or service information from the video database 104.1 over the video channel 915. For example, the system administrator, interacting with the configuration module 204, may define certain rules governing the access of such specified audio/video content for that product or service from the video database 104.1.

The video repository module 208 provides an audio/video stream 845 containing the requested product or service information content to the audio/video splitter component 402.2, which derives an audio stream 847 and a video stream 849 from the audio/video stream 845. The audio/video splitter component 402.2 provides the video stream 849 to the text overlay module 814, and provides the audio stream 847 to both the voice mixer 408.1 and the voice mixer 408.2. The text overlay module 814 forwards the video stream 849 to the audio/video splitter component 402.1. The voice mixer 408.1 mixes and controls the volume levels of the audio stream 847 for the product or service information and the audio stream 834 from the DTMF clamping component 407.1, and generates a mixed audio stream 851. The voice mixer 408.2 receives the audio stream 847 for the product or service information, mixes and controls the volume levels of the audio stream 847 and the audio stream 832 from the DTMF clamping component 407.2, and provides a mixed audio stream 853 to the audio/video splitter component 402.1. It is noted that the audio stream 832 may contain the voice of the marketing, sales, or support services representative on the audio telephone 510. The audio/video splitter component 402.1 generates a combined audio/video stream 855 from the audio stream 853 (which contains the audio for the product or service information and the voice of the representative on the audio telephone 510) and the video stream 849 (which contains the video for the product or service information). The audio/video splitter component 402.1 provides the combined audio/video stream 855 to the video call handling module 202, which, in turn, provides the combined audio/video stream 855 to the mobile phone 508 over the video channel 914. In response to receipt of the combined audio/video stream 855, the mobile phone 508 generates audio/video outputs for consumption (e.g., listening/viewing) by the user of the mobile phone 508.

As a result, the user of the mobile phone 508 can view the video for the requested product or service information on the display of the mobile phone 508 while listening to the voice of the representative on the audio telephone 510 via the speaker of the mobile phone 508. The user of the mobile phone 508 can also listen to the audio for the requested product or service information mixed with the voice of the representative on the audio telephone 510, depending on the controlled volume levels of the respective audio signals. In addition, the user of the audio telephone 510 can listen to the audio for the requested product or service information mixed with the voice of the user of the mobile phone 508, depending on the controlled volume levels of these respective audio signals.

An exemplary method of operating the presently disclosed video support systems for providing video support for standard (i.e., non-video-capable) communications systems is described below with reference to FIG. 11. The exemplary method described below may be employed to provide video support for a call between a video-capable communications device and a non-video-capable communications system. As depicted in step 1102, a video call connection for a video call with the video-capable communications device is established by a video call handler. Further, an audio call connection for an audio call with the non-video-capable communications system is established by an audio call handler, as depicted in step 1104. As depicted in step 1106, the call between the video-capable communications device and the non-video-capable communications system is completed over the respective audio and video call connections by a call connection matrix, which is communicably coupled to the audio and video call handlers. As depicted in step 1108, video content is accessed from a video source by a controller. Moreover, in response to at least one command from the video-capable communications device or the non-video-capable communications system, a video stream for the video call is controlled during the call by the controller using the video content from the video source, as depicted in step 1110.

Having described the above illustrative embodiments of the presently disclosed systems and methods of providing video support for standard (i.e., non-video-capable) communications systems, other alternative embodiments or variations may be made or performed. For example, it was described above that the presently disclosed video support system can receive and act on commands generated by the standard communications system for controlling the audio/video outputs of a video-capable communications device. To that end, the standard communications system may be configured to include a DTMF module operative to send DTMF tones automatically to the video support system, for providing in-band control over the access of video content from the video database, video streams from the video camera, and/or any other suitable behavior or parameter of the video support system. Further, in one or more alternative embodiments, the standard communications system may be configured to include an IP module for providing out-of-band control over such access of video content and/or any other suitable behavior or parameter of the video support system.

It was also described above that the video support system can make a voice call directly to the standard communications system over a voice channel. In one or more alternative embodiments, an additional telephone line may be provided to allow the video support system to make an outside call to the standard communications system, instead of making direct calls to the standard communications system.

It will be appreciated by those of ordinary skill in the art that one or more of the functions necessary to implement the above-described systems and methods of providing video support for standard (i.e., non-video-capable) communications systems can be embodied—in whole or in part—in hardware, software, or some suitable combination of hardware and software, using programmable micro-controllers, microprocessors, digital signal processors, and/or logic arrays, read-only memory (ROM), random access memory (RAM), CD-ROM, personal computers and computer displays, and/or any other suitable hardware and/or software programs, components, and/or devices.

It will be further appreciated by those skilled in the art that modifications to and variations of the above-described systems and methods may be made without departing from the inventive concepts disclosed herein. Accordingly, the invention should not be viewed as limited except as by the scope and spirit of the appended claims.

What is claimed is:

1. A system for supporting a call between a video-capable communications device and a non-video-capable communications system, comprising:
    an audio call handler operative to establish an audio call connection for an audio call with the non-video-capable communications system;
    a video call handler operative to establish a video call connection for a video call with the video-capable communications device, and to handle a video stream for the video call;
    a video access component operative to access one or more video content items from a video server;

a call connection component communicably coupled to the audio call handler, the video call handler, and the video access component, the call connection component being operative to complete the call between the video-capable communications device and the non-video-capable communications system over the respective audio and video call connections; and a controller operative, in response to at least one command from the non-video-capable communications system for selecting at least one of the video content items from the video server, to control, during the call between the video-capable communications device and the non-video-capable communications system:
  (i) the access of the at least one selected video content item from the video server; and
  (ii) the video stream for the video call using the at least one selected video content item from the video server wherein the controller is further operative, in response to at least one second command from the video-capable communications device for selecting at least a second one of the video content items from the video server, to control, during the call between the video-capable communications device and the non-video-capable communications system:
  (i) the access of the selected second one of the video content items from the video server; and
  (ii) the video stream for the video call using the selected second one of the video content items from the video server.

2. The system of claim 1 wherein the at least one command comprises at least one predetermined DTMF (dual tone multi-frequency) tone, and wherein the call connection component includes at least one DTMF detector operative to detect the at least one predetermined DTMF tone for the at least one command.

3. The system of claim 2 wherein the audio call handler is operative to handle an audio stream for the audio call, and wherein the at least one predetermined DTMF tone is included in the audio stream for the audio call.

4. The system of claim 3 wherein the call connection component includes at least one DTMF clamping component operative to remove the at least one predetermined DTMF tone from the audio stream for the audio call.

5. The system of claim 2 wherein the video call handler is operative to handle an audio stream for the video call, and wherein the at least one predetermined DTMF tone is included in the audio stream for the video call.

6. The system of claim 5 wherein the call connection component includes at least one DTMF clamping component operative to remove the at least one predetermined DTMF tone from the audio stream for the video call.

7. The system of claim 1 wherein the at least one command comprises at least one predetermined speech term, and wherein the call connection component further includes a speech recognition component operative to recognize the at least one predetermined speech term for the at least one command.

8. The system of claim 7 wherein the audio call handler is operative to handle an audio stream for the audio call, and wherein the at least one predetermined speech term is included in the audio stream for the audio call.

9. The system of claim 8 wherein the call connection component includes at least one speech removal component operative to remove the at least one predetermined speech term from the audio stream for the audio call.

10. The system of claim 7 wherein the video call handler is operative to handle an audio stream for the video call, and wherein the at least one predetermined speech term is included in the audio stream for the video call.

11. The system of claim 10 wherein the call connection component includes at least one speech removal component operative to remove the at least one predetermined speech term from the audio stream for the video call.

12. The system of claim 1 wherein the video access component is further operative to access audio/video content from the video server.

13. The system of claim 12 wherein the call connection component includes an audio/video splitter operative to generate an audio stream from the audio/video content.

14. The system of claim 13 wherein the video call handler is further operative to handle an audio stream for the video call, and wherein the call connection component includes an audio mixer operative to mix the audio stream for the video call with the audio stream from the audio/video content to generate an audio stream for the audio call.

15. The system of claim 13 wherein the audio call handler is further operative to handle an audio stream for the audio call, and wherein the call connection component includes an audio mixer operative to mix the audio stream for the audio call with the audio stream from the audio/video content to generate an audio stream for the video call.

16. The system of claim 1 wherein the video access component is further operative to store the video stream for the video call in the video server.

17. The system of claim 1 wherein the video call handler is further operative to handle a combined audio/video stream for the video call.

18. The system of claim 17 wherein the video access component is further operative to store the combined audio/video stream for the video call in the video server.

19. The system of claim 1 wherein the at least one selected video content item from the video server contains at least one video image, and wherein the call connection component includes a text overlay component operative to overlay predefined text onto the at least one video image.

20. The system of claim 19 wherein the controller is further operative to control the overlay of the predefined text onto the at least one video image.

21. The system of claim 1 wherein the call connection component includes a text-to-speech component operative to convert predefined text into a speech stream.

22. The system of claim 21 wherein the video call handler is further operative to handle an audio stream for the video call, and wherein the call connection component further includes an audio mixer operative to mix the audio stream for the video call with the speech stream to generate an audio stream for the audio call.

23. The system of claim 22 wherein the video access component is further operative to access audio/video content from the video server, wherein the call connection component further includes an audio/video splitter operative to generate an audio stream from the audio/video content, and wherein the audio mixer is further operative to mix the audio stream from the audio/video content with the audio stream for the video call and the speech stream to generate the audio stream for the audio call.

24. The system of claim 21 wherein the audio call handler is further operative to handle an audio stream for the audio call, and wherein the call connection component further includes an audio mixer operative to mix the audio stream for the audio call with the speech stream to generate an audio stream for the video call.

25. The system of claim 24 wherein the video access component is further operative to access audio/video content from the video server, wherein the call connection component further includes an audio/video splitter operative to generate an audio stream from the audio/video content, and wherein the audio mixer is further operative to mix the audio stream from the audio/video content with the audio stream for the audio call and the speech stream to generate the audio stream for the video call.

26. A method of providing video support for a call between a video-capable communications device and a non-video-capable communications system, the method comprising the steps of:
- establishing, by an audio call handler, an audio call connection for an audio call with the non-video-capable communications system;
- establishing, by a video call handler, a video call connection for a video call with the video-capable communications device;
- accessing one or more video content items from a video server;
- completing, by a call connection component, the call between the video-capable communications device and the non-video-capable communications system over the respective audio and video call connections, the call connection component being communicably coupled to the audio call handler and the video call handler; and
- controlling, by a controller, in response to at least one command from the non-video-capable communications system for selecting at least one of the video content items from the video server, during the call between the video-capable communications device and the non-video-capable communications system:
  (i) the access of the at least one selected video content item from the video server; and
  (ii) the video stream for the video call using the at least one selected video content item from the video server, wherein the controlling by the controller includes, in response to at least one second command from the video-capable communications device for selecting at least a second one of the video content items from the video server, during the call between the video-capable communications device and the non-video-capable communications system:
  (i) controlling the access of the selected second one of the video content items from the video server; and
  (ii) controlling the video stream for the video call using the selected second one of the video content items from the video server.

27. The method of claim 26 wherein the controlling by the controller includes controlling the access of the at least one selected video content item from the video server in response to the at least one command comprising at least one predetermined DTMF tone from the non-video-capable communications system.

28. The method of claim 26 wherein the controlling by the controller includes controlling the access of the at least one selected video content item from the video server in response to the at least one command comprising at least one predetermined speech term from the non-video-capable communications system.

29. The method of claim 26 wherein the controlling by the controller includes controlling the video stream for the video call in response to the at least one command comprising at least one predetermined DTMF tone from the non-video-capable communications system.

30. The method of claim 26 wherein the controlling by the controller includes controlling the video stream for the video call in response to the at least one command comprising at least one predetermined speech term from the non-video-capable communications system.

* * * * *